United States Patent
Yamada et al.

(10) Patent No.: US 6,574,182 B1
(45) Date of Patent: Jun. 3, 2003

(54) OPTICAL PICKUP COMPATIBLE WITH A PLURALITY OF TYPES OF OPTICAL DISKS HAVING DIFFERENT THICKNESSES

(75) Inventors: Masato Yamada, Inuyama (JP); Seiji Kajiyama, Ibi-gun (JP); Yasuyuki Kanou, Hashima (JP); Yoichi Tsuchiya, Hashima (JP)

(73) Assignee: Sanyo Electric Co., Ltd, Moriguchi (JP)

( * ) Notice: Subject to any disclaimer, the term of this patent is extended or adjusted under 35 U.S.C. 154(b) by 0 days.

(21) Appl. No.: 09/807,415
(22) PCT Filed: Dec. 15, 1999
(86) PCT No.: PCT/JP99/07054
§ 371 (c)(1),
(2), (4) Date: Apr. 19, 2001
(87) PCT Pub. No.: WO00/36597
PCT Pub. Date: Jun. 22, 2000

(30) Foreign Application Priority Data

Dec. 16, 1998 (JP) ............................ 10-357904

(51) Int. Cl.⁷ .................................................. G11B 7/00
(52) U.S. Cl. .............................. 369/112.03; 369/112.15; 369/44.23; 369/112.01
(58) Field of Search ............................ 369/44.11, 44.12, 369/44.23, 44.24, 112.01, 112.03, 112.04, 112.1, 109.01, 103, 112.15

(56) References Cited

U.S. PATENT DOCUMENTS 6,084,843 A * 7/2000 Abe et al. .............. 369/112.07
6,166,854 A * 12/2000 Katsuma .................. 359/565

FOREIGN PATENT DOCUMENTS

| JP | 8-278477 | 10/1996 |
| JP | 10-27373 | 1/1998 |
| JP | 10-143903 | 5/1998 |
| JP | 10-143908 | 5/1998 |
| JP | 10-228664 | 8/1998 |
| JP | 10-283662 | 10/1998 |
| JP | 11-7653 | 1/1999 |
| WO | WO98/19303 | 5/1998 |

* cited by examiner

Primary Examiner—Muhammad Edun
(74) Attorney, Agent, or Firm—Armstrong, Westerman & Hattori, LLP.

(57) ABSTRACT

In an optical pickup device (10) including a laser light source (1) and an objective lens (7), an optical device (6) is provided that transmits a laser beam of 635 nm in wavelength emitted from a first semiconductor laser (1A) straightforwardly into the objective lens (7) while maintaining its incident intensity, and that selectively diffracts a laser beam of 780 nm in wavelength emitted from a second semiconductor laser (1B) to a desired direction while maintaining its incident intensity and directs only the predetermined center portion of the laser beam into the objective lens (7). The optical pickup device (10) records or reproduces a signal onto or from a plurality of types of optical disks differing in substrate thickness while directing a laser beam of sufficient intensity onto a signal recording plane.

17 Claims, 22 Drawing Sheets

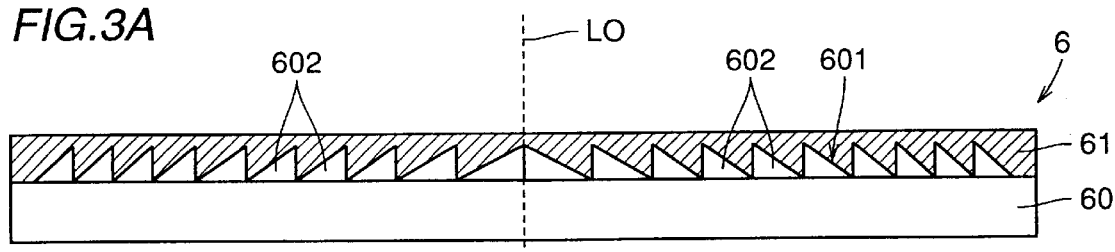
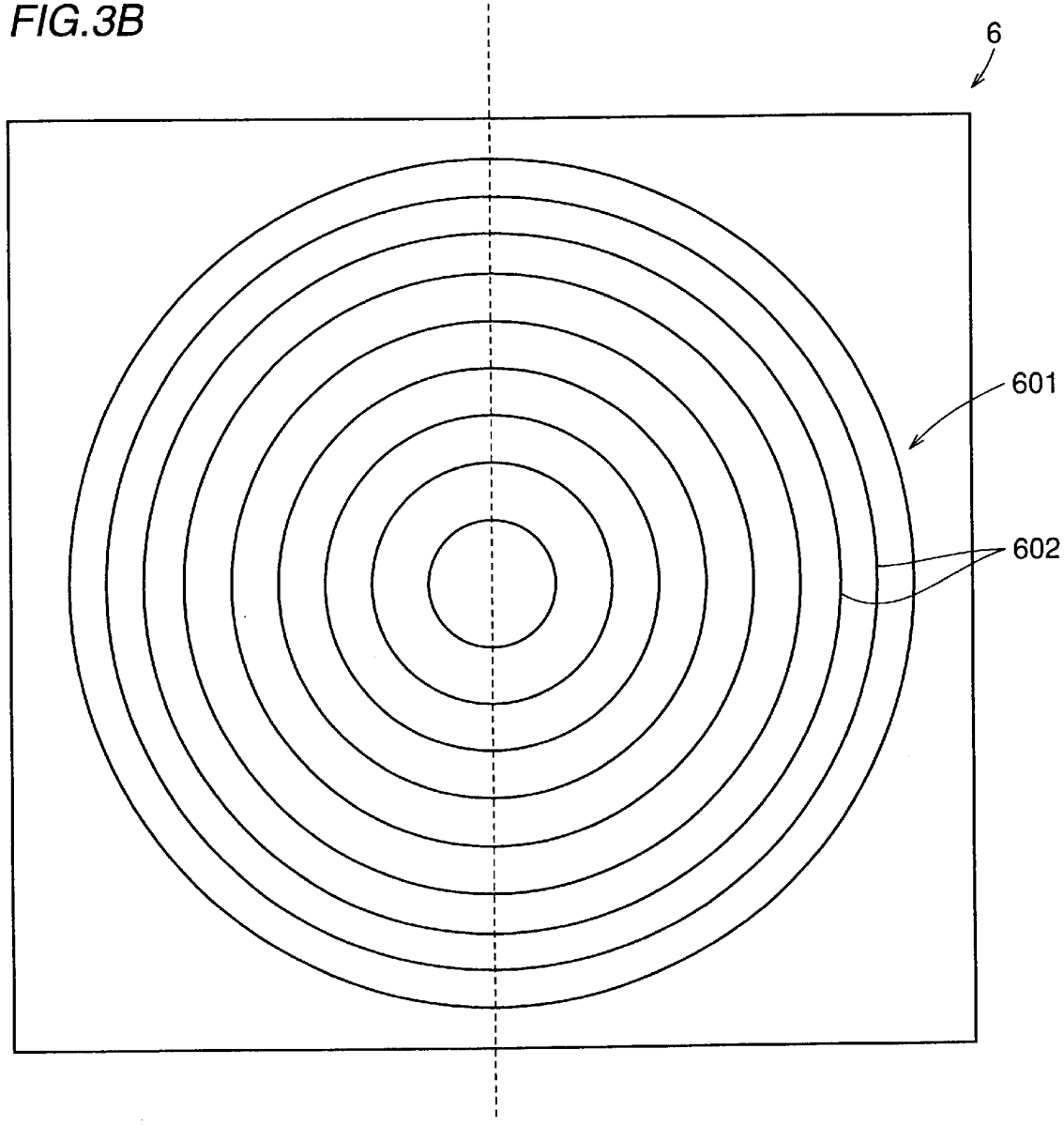

X-X' CROSS SECTION RIM INTENSITY

Y-Y' CROSS SECTION RIM INTENSITY

OBJECTIVE LENS EFFECTIVE DIAMETER 7.5 DEGREE X

17 DEGREE

FOCAL LENGTH : 9mm
NA : 0.15

X-X' CROSS SECTION RIM INTENSITY

Y-Y' CROSS SECTION RIM INTENSITY

X-X' CROSS SECTION RIM INTENSITY

Y-Y' CROSS SECTION RIM INTENSITY

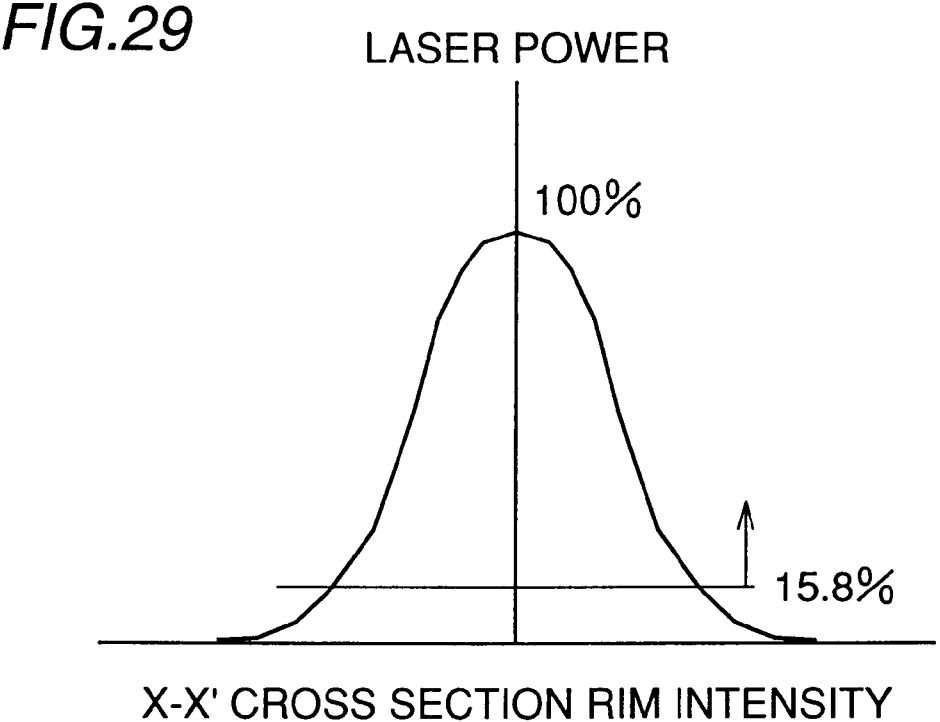
FIG.29 X-X' CROSS SECTION RIM INTENSITY
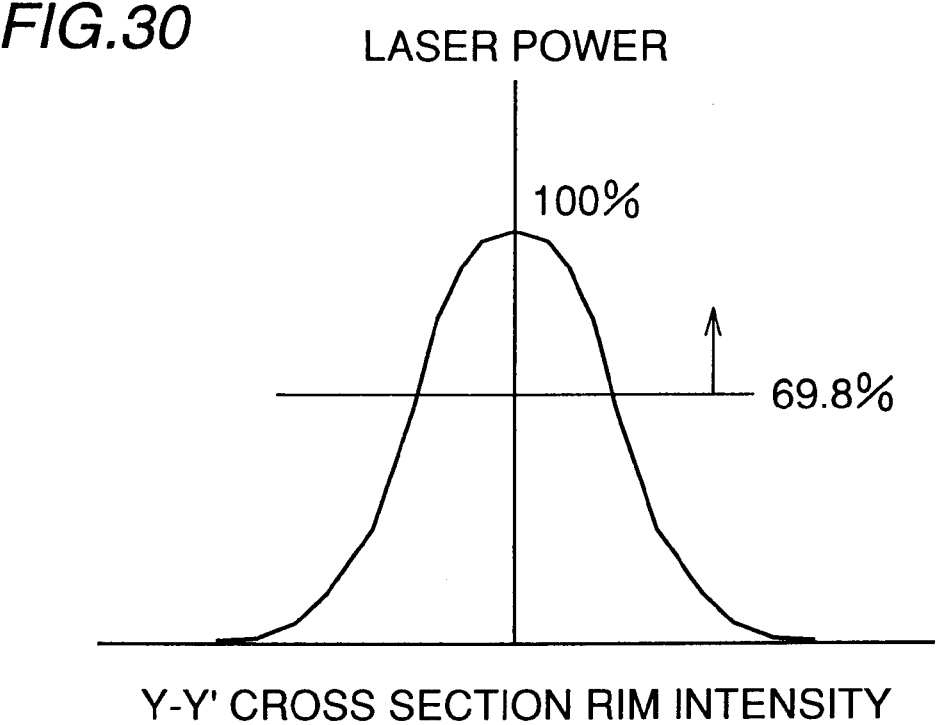
FIG.30 Y-Y' CROSS SECTION RIM INTENSITY

OPTICAL PICKUP COMPATIBLE WITH A PLURALITY OF TYPES OF OPTICAL DISKS HAVING DIFFERENT THICKNESSES

TECHNICAL FIELD

The present invention relates to optical pickup devices. More particularly, the present invention relates to an optical pickup device that directs a laser beam of sufficient intensity for signal recording onto an optical recording medium to record and/or reproduce a signal onto/from a plurality of types of optical recording media.

BACKGROUND ART

Optical disks of approximately 1.2 mm in thickness to read out information using a semiconductor laser such as a CD-ROM (Compact Disk-Read Only Memory) are proposed. By carrying out focus servo and tracking servo on the objective lens for pickup with respect to this type of optical disk, a laser beam is directed to a pit train on the signal recording plane from which a signal is reproduced.

A CD-R (Compact Disk-Recordable) is available that has a recording density identical to that of the CD and that allows recording only once. A laser beam of 780 nm in wavelength is employed in recording and reproducting signals thereof.

Recently, the density is further increased to record a motion picture for a long period of time. For example, a DVD (Digital Video Disk) that records 4.7 Gbytes of information on one plane of an optical disk having a diameter of 12 cm that is identical to that of the CD-ROM is commercially available. The thickness of a DVD is approximately 0.6 mm. By fixing these planes together, 9.4 Gbytes of information can be recorded in one disk.

Attention is focused on a magneto-optical recording medium as a rewritable recording medium of great storage capacity and high reliability. The magneto-optical recording media are now applied as computer memories and the like. Standardization of a magneto-optical recording medium having a storage capacity of 6.0 Gbytes (AS-MO (Advanced Storage Magneto Optical Disk) standard) is in progress to be provided for actual usage. This magneto-optical recording medium has the signal reproduced by the MSR (Magnetically Induced Super Resolution) method. More specifically, a laser beam is projected to transfer the magnetic domain of the recording layer of the magneto-optical recording medium to a reproduction layer and also forming a detection window in the reproduction layer to allow detection of only the transferred magnetic domain. The transferred magnetic domain is detected from the formed detection window. A laser beam of 600–700 nm in wavelength is employed for recording and/or reproducing a signal onto and/or from the magneto-optical recording medium.

It is expected that there will be the coexistence of CDs, CD-Rs, DVDs and magneto-optical recording media in the future. The need arises for an optical pickup device that can reproduce information from such optical disks and that can record a signal onto a recordable optical disk. WO 98/19303 discloses an optical pickup device that allows compatible reproduction between a CD-R and a DVD.

The proposed CD-R/DVD compatible pickup includes a semiconductor laser generating a laser beam of 635 nm in wavelength for reproduction of a DVD and a semiconductor laser generating a laser beam of 780 nm in wavelength for recording and reproduction of a CD-R. When a signal is to be recorded onto or reproduced from a CD-R using a laser beam of 780 nm in wavelength, the laser beam is diffracted and a desired diffracted light thereof, for example only the first order light, is introduced into the objective lens to collect light in order to correct aberration caused by difference in the thickness of the substrate.

Therefore, the zero order light or minus first order light could not be used effectively. There was a problem that a laser beam sufficient in intensity for recording could not be obtained at the signal recording plane of the CD-R.

DISCLOSURE OF THE INVENTION

An object of the present invention is to provide an optical pickup device capable of recording and/or reproducing a signal onto/from a plurality of types of optical disks of different thickness, suppressing laser beam loss to the minimum.

According to an aspect of the present invention, an optical pickup device recording and/or reproducing a signal onto/from a first optical disk and a second optical disk thicker than the first optical disk includes a light source, an objective lens, and an optical device. The light source generates a laser beam. The objective lens is located opposite to the first and second optical disks. The optical device is arranged between the light source and the objective lens to transmit the laser beam from the light source straightforwardly during recording or reproduction of the first optical disk, and bending substantially the entire laser beam from the light source and increasing the diameter thereof to guide the center portion of the laser beam towards the objective lens and the peripheral portion of the laser beam outside the objective lens during recording or reproduction of the second disk.

In the optical pickup device, the optical device bends substantially the entire laser beam from the light source so that only the center portion of the laser beam is guided to the objective lens during recording or reproduction of the second optical disk, so that most of the laser beam can be used effectively with the exception that the peripheral portion is lost. A signal can be recorded onto the first and second optical disks or a signal can be reproduced from the first and second optical disks while suppressing loss of the laser beam at the minimum.

Preferably, the optical device includes a first optical member and a second optical member. The first optical member has a first refractive index. The second optical member is in contact with the first optical member, and has the first refractive index during recording or reproduction of the first optical disk, and has a second refractive index differing from the first refractive index during recording or reproduction of the second optical disk. During recording or reproduction of the first optical disk, the entire optical device has the first refractive index. Therefore, the laser beam from the light source is transmitted straightforwardly. In contrast, the first and second optical members have different refraction indexes during recording or reproduction of the second optical disk. Therefore, the optical device diffracts or refracts the laser beam from the light source.

Further preferably, the light source generates a first laser beam having a first wavelength during recording or reproduction of the first optical disk, and generates a second laser beam having a second wavelength differing from the first wavelength during recording or reproduction of the second optical disk. The first optical member has a first refractive index for the first and second wavelengths. The second optical member has the first refractive index for the first wavelength and the second refractive index for the second wavelength. Since the refractive index of the second optical member changes according to the wavelength, the laser beam can be transmitted straightforwardly or bent without mechanical switching.

Also preferably, the first optical member includes a hologram formed to come into contact with the second optical member. Therefore, the optical device diffracts the laser beam by interference during recording or reproduction of the second optical disk.

Further preferably, the first optical member is arranged at the light source side. The second optical member is arranged at the objective lens side. The first refractive index is higher than the second refractive index. The hologram includes a plurality of annular projections formed concentrically. The pitch of the annular projections become smaller as towards the outer circumference. Therefore, the optical device diffracts the laser beam at a greater angle as towards the circumference.

Preferably, each of the annular projections has a triangular cross section radially. Therefore, the optical device can diffract the incident laser beam in a desired direction without generating 0 order or −1 order diffracted light.

BRIEF DESCRIPTION OF THE DRAWINGS

FIGS. 3A and 3B are a sectional view and a plan view, respectively, of the optical device of FIG. 2.

FIG. 29 shows the intensity distribution of a laser beam along cross section X–X' of FIG. 28.

FIG. 30 shows the intensity distribution of a laser beam along cross section Y—Y of FIG. 28.

BEST MODE FOR CARRYING OUT THE INVENTION

Figure 1:
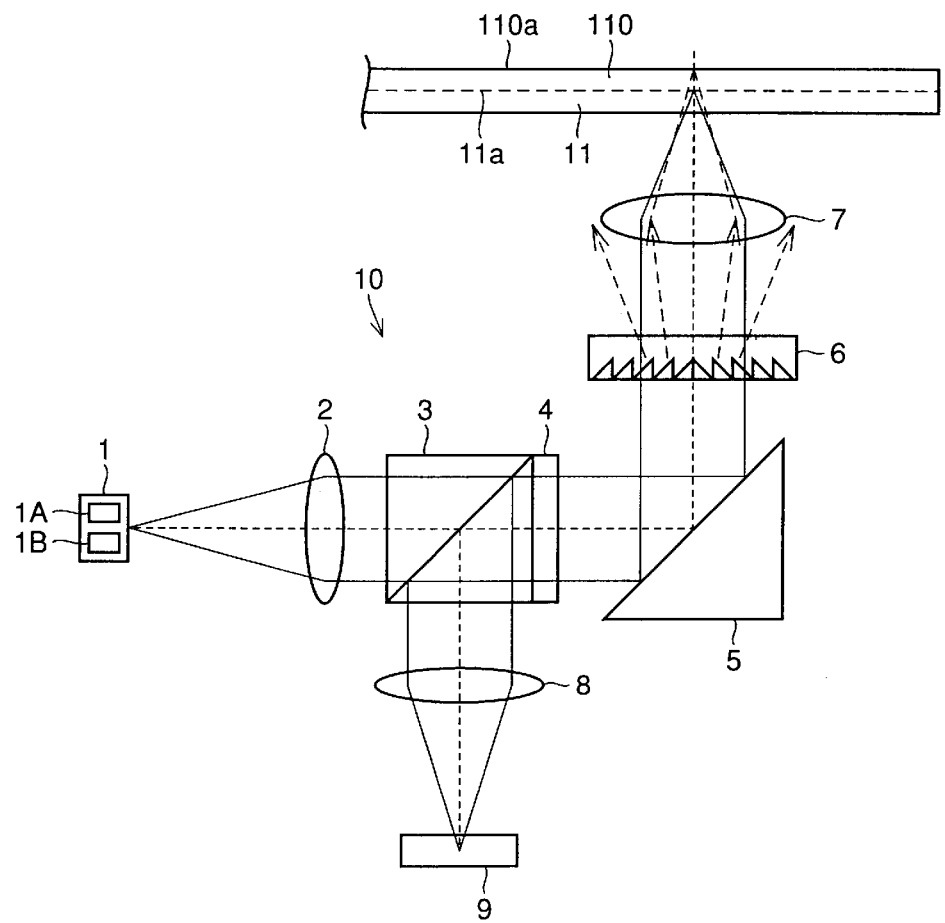
FIG. 1 shows a structure of an optical pickup device of the present invention.

Embodiments of the present invention will be described with reference to the drawings. In the drawings, the same or corresponding components have the same reference characters allotted, and their description will not be repeated.

Referring to FIG. 1, an optical pickup device 10 of the present invention includes a laser light source 1, a collimator lens 2, a polarization beam splitter 3, a half-wave plate 4, a rising mirror 5, an optical device 6, an objective lens 7, a collective lens 8, and a photodetector 9.

Laser light source 1 includes a first semiconductor laser 1A generating a laser beam of 635 nm in wavelength (tolerance±15 nm, the same applies hereinafter), and a second semiconductor laser 1B generating a laser beam of 780 nm in wavelength (tolerance±15 nm, the same applies hereinafter). A laser drive circuit not shown selectively drives first semiconductor laser 1A and second semiconductor laser 1B to selectively generate a laser beam of 635 nm in wavelength and a laser beam of 780 nm in wavelength.

Collimator lens 2 renders the laser beam from laser light source 1 parallel. Polarization beam splitter 3 transmits the laser beam from collimator lens 2, and reflects the reflected light from an optical disk 11 (or 110) towards photodetector 9. Half-wave plate 4 rotates the plane of polarization of the laser beam 90 degrees and transmits the laser beam. Rising mirror 5 reflects the laser beam passing through half-wave plate 4 towards optical disk 11 (or 110).

Optical device 6 transmits the laser beam of 635 nm in wavelength straightforwardly into objective lens 7 while maintaining the incident intensity, and diffracts the laser beam of 780 nm in wavelength towards a desired direction to increase the diameter and enter the center portion into objective lens 7 and bend the peripheral portion outside objective lens 7.

Objective lens 7 is located opposite to optical disk 11 (or 110) to focus the laser beam from optical device 6 to direct the laser beam onto a signal recording plane 11a (or 110a) of optical disk 11 (or 110). Objective lens 7 is designed corresponding to an optical disk 11 having a substrate thickness of 0.6 mm. The numerical aperture is 0.6 (tolerance ±0.05). Collective lens 8 collects the laser beam reflected at polarization beam splitter 3. Photo detector 9 detects the laser beam collected by collective lens 8.

Optical pickup device 10 reproduces a signal from a DVD 11 having a substrate thickness of 0.6 mm, and records/ reproduces a signal to/from a CD-R 110 having a substrate thickness of 1.2 mm. When a signal is to be reproduced from DVD 11, a laser beam having a wavelength of 635 nm is output from laser light source 1. When a signal is to be recorded/reproduced with respect to CD-R, a laser beam having a wavelength of 780 nm is generated from laser light source 1.

Particularly in the case where a signal is to be recorded on CD-R 110 as will be described afterwards, optical pickup device 10 has a beam focused on a signal recording plane 110a of CD-R 110 for recording with little degradation in the power of the laser beam of 780 nm in wavelength emitted from second semiconductor laser 1B.

Details of optical device 6 will be described hereinafter with reference to FIGS. 2, 3A and 3B.

Figure 2:
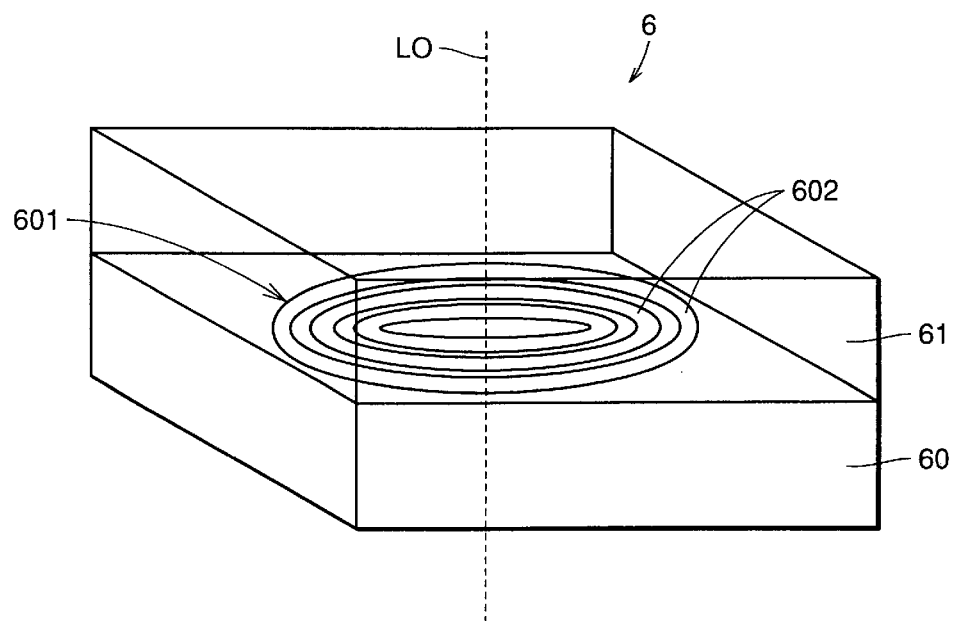
FIG. 2 is a prospective view of the optical device of FIG. 1.

Referring to FIG. 2, optical device 6 includes a first optical member 60 formed of a transmittive substrate such as of glass, and a second optical member 61 formed to cover first optical member 60. A plurality of annular projections 602 are formed at a predetermined distance concentrically about an optical axis L0 on the main surface of first optical member 60. Projections 602 form a hologram 601. Projection 602 is formed of, for example, $TiO_2$, and has the same refractive index of 2.3 with respect to the laser beam of 635 nm in wavelength and the laser beam of 780 nm in wavelength. Second optical member 61 is formed of, for example, silicon nitride (SiN), silicon carbide (SiC), and has the refractive index of 2.3 for the laser beam of 635 nm in wavelength and the refractive index of 1.8 for the laser beam of 780 nm in wavelength.

The cross sectional structure of optical device 6 at an arbitrary plane including optical axis L0 will be described with reference to FIG. 3A. Projections 602 having the shape of a right triangle are formed symmetrically with respect to optical axis L0 at a predetermined interval at the surface of first optical member 60. Projections 602 have the height of 0.337 μm, the interval of 296.43 μm at the innermost circumferential region and 31.256 μm at the outermost circumferential region. The pitch becomes gradually narrower from the inner circumference towards the outer circumference. Second optical member 61 is formed to come into contact with the main surface of first optical member 60 forming hologram 601. First optical member 60 is arranged at the light source 1 side whereas second optical member 61 is arranged at the objective lens 7 side.

FIG. 3B is a plan view of the structure of optical device 6. Hologram 601 is formed of a plurality annular projections 602 concentrically at the surface of transmittive substrate 60. It is apparent that the pitch of annular projections 602 becomes smaller as towards the outer circumference. The hologram lens provided by Aerial Imaging Corporation (U.S.A.) can be employed as first optical member 60.

Figure 4A:
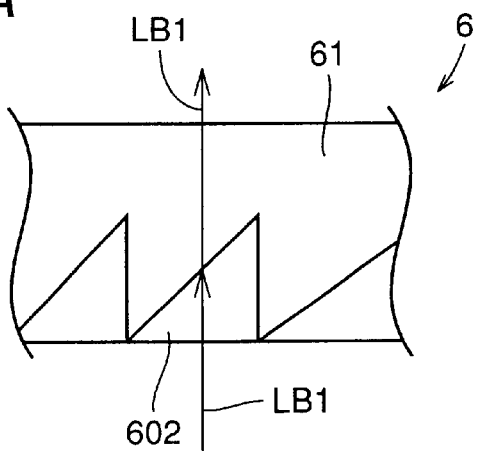
FIGS. 4A and 4B are diagrams to describe the property of the optical device of FIG. 1 when the wavelength is 635 nm and 780 nm, respectively.

The optical property of optical device 6 will be described with reference to FIGS. 4A and 4B. Referring to FIG. 4A, projection 602 and second optical member 61 both have a refractive index of 2.3 with respect to the laser beam of 635 nm in wavelength. Therefore, laser beam LB1 of 635 nm in wavelength that enters optical device 6 is directly transmitted as laser beam LB1 without being diffracted at optical device 6. As a result, the laser beam of 635 nm in wavelength will not be reduced in power even if transmitted through optical device 6.

Figure 4B:
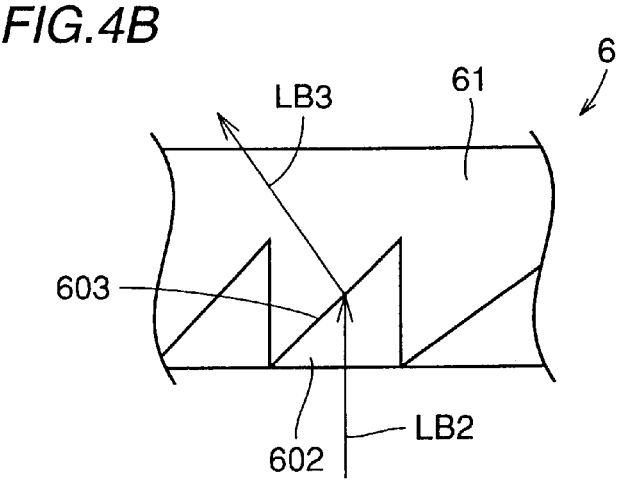

Referring to FIG. 4B, projection 602 has a refractive index of 2.3 and second optical member 61 has a refractive index of 1.8 with respect to the laser beam of 780 nm in wavelength. It is to be noted that projection 602 has a gentle slope 603 at the interface with second optical member 61. Therefore, laser beam LB2 of 780 nm in wavelength that enters optical device 6 is diffracted towards the outer side from the optical axis via slope 603 when entering second optical member 61 from first optical member 60 to be transmitted as diffracted light LB3 from optical device 6.

Figure 4C:
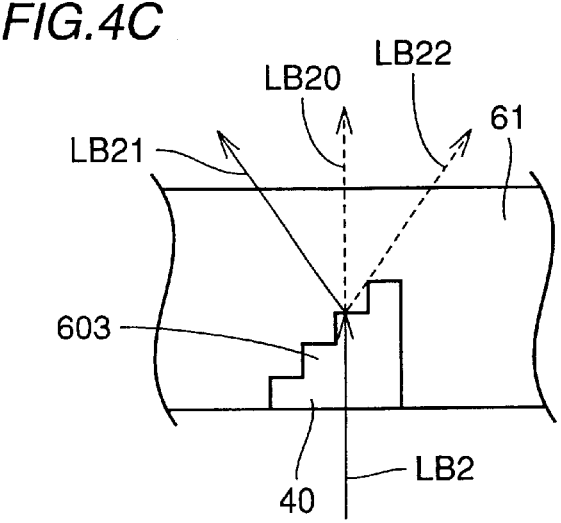
FIG. 4C is a diagram to describe the property of the optical device having a hologram of a stepped shape in cross section.

FIG. 4C corresponds to the case where first optical member 60 has step-graded projections 40 at the interface with second optical member 61. Laser beam LB2 of 780 nm in wavelength is diffracted into 0 order light LB20, +first order light LB21 and −1 order light LB22 when entering second optical member 61 from first optical member 60. Therefore, the power of the laser beam will be reduced when only one of the three diffracted light LB20, LB21 and LB22 is employed. However, gentle slope 603 of projection 602 causes laser beam LB2 of 780 nm in wavelength to be diffracted almost 100% to first order light LB3 by optical device 6. Therefore, there is little reduction in the power of laser beam LB2 passing through optical device 6.

Figure 5:
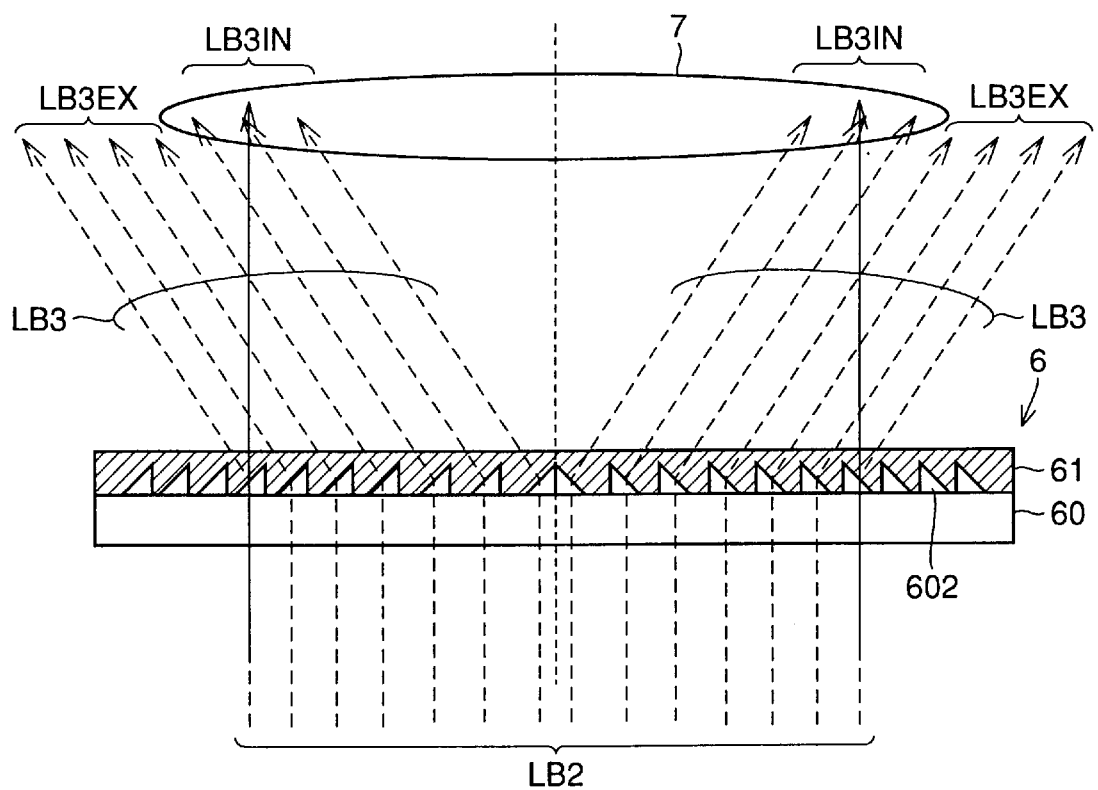
FIG. 5 is a diagram to describe the path of a laser beam of 780 nm in wavelength from the optical device to the objective lens.

Referring to FIG. 5, laser beam LB2 of 780 nm in wavelength incident to optical device 6 is diffracted in a desired direction to be transmitted as diffracted light LB3 from optical device 6. As to diffracted light LB3 passing through optical device 6, peripheral portion LB3EX does not enter objective lens 7. Only a predetermined center portion LB3IN enters projection lens 7. Therefore, optical device 6 works on laser beam LB2 of 780 nm in wavelength to diffract the laser beam to diffracted light LB3 of a desired direction, and directs only predetermined center portion LB3IN into objective lens 7. Since the distance between respective annular projections 602 of optical device 6 becomes gradually smaller from the center towards the periphery, the angle of diffraction differs between the center portion and the peripheral portion. Optical device 6 functions in a manner of diffracting laser beam using a lens.

The efficiency $\eta_m$ of m order diffracted light by the hologram is generally represented by the following equation (1).

$$\eta_m = \left| \frac{1}{T} \int_0^T A(x) \exp\{i\psi(x)\} \exp\left(-i\frac{2\pi mx}{T}\right) dx \right|^2 \quad (1)$$

where T is the hologram cycle (here, the pitch of annular projections 602), A(x) is the transmittance, x is the position on the hologram, $\psi(x)$ is the phase difference function, and m is the order.

Since hologram 601 is the kinoform type formed of a plurality of annular projections 602 having a triangular cross section, the phase difference function ψ(x) is represented by the following equation (2).

$$\psi(x) = \frac{d\Delta n}{T} \times \frac{2\pi}{\lambda} \times x, \quad m = 1, \quad A(x) = 1 \tag{2}$$

In equation (2), d is the height of projection 602, Δn is the difference in the refractive index, and λ is the wavelength.

When A(x)=1, the diffraction efficiency of the first order light is represented by the following equation (3).

$$\begin{aligned}\eta_i &= \left|\frac{1}{T}\int_0^T \exp\left(i\frac{d\Delta n}{T}\frac{2\pi}{\lambda}x\right)\exp\left(-i\frac{2\pi x}{T}\right)dx\right|^2 \\ &= \left|\frac{1}{T}\int_0^T \exp\left\{i\frac{2\pi x\left(\frac{d\Delta n}{\lambda} - 1\right)}{T}\right\}dx\right|^2 \quad \left(\frac{d\Delta n}{\lambda} - 1 = A\right) \\ &= \left|\frac{1}{T}\int_0^T \left(\cos i\frac{2\pi xA}{T} + i\sin i\frac{2\pi xA}{T}\right)dx\right|^2 \\ &= \left|\frac{1}{T} \times \frac{T}{2\pi A}\left\{\left[\sin\frac{2\pi xA}{T}\right]_0^T + i\left[-\cos\frac{2\pi xA}{T}\right]_0^T\right\}\right|^2 \\ &= \left|\frac{1}{2\pi A}\{(\sin 2\pi A - 0) + i(-\cos 2\pi A + 1)\}\right|^2 \\ &= \frac{1}{(2\pi A)^2}(\sin^2 2\pi A + \cos^2 2\pi A - 2\cos 2\pi A + 1) \\ &= \frac{2 - 2\cos 2\pi A}{(2\pi A)^2} \\ &= \frac{4\sin^2 \pi A}{(2\pi A)^2} \\ &= \frac{\sin^2 \pi A}{(\pi A)^2} \quad \left(\sin c(x) = \frac{\sin(\pi x)}{\pi x}\right) \\ &= \sin c^2 A \\ &= \sin c^2\left(\frac{d\Delta n}{\lambda} - 1\right) \\ &= \sin c^2\left(\frac{d\Delta n - \lambda}{\lambda}\right)\end{aligned} \tag{3}$$

It is apparent from the above that optical device 6 converts laser beam LB2 of 780 nm in wavelength into first order diffracted light LB3 at high efficiency. Since the pitch of annular projections 602 becomes smaller towards the outer circumference, the laser beam passing through the center of optical device 6 travels straightforwardly while the laser beam at the periphery is bent at a greater angle as towards the outer circumference. Therefore, the center portion of laser beam LB2 enters objective lens 7 whereas the peripheral portion of laser beam LB2 is deviated from objective lens 7. Thus, optical device 6 can diffract substantially the entire laser beam LB2 of 780 nm in a desired direction to enter objective lens 7 except for the peripheral portion thereof.

Figure 6:
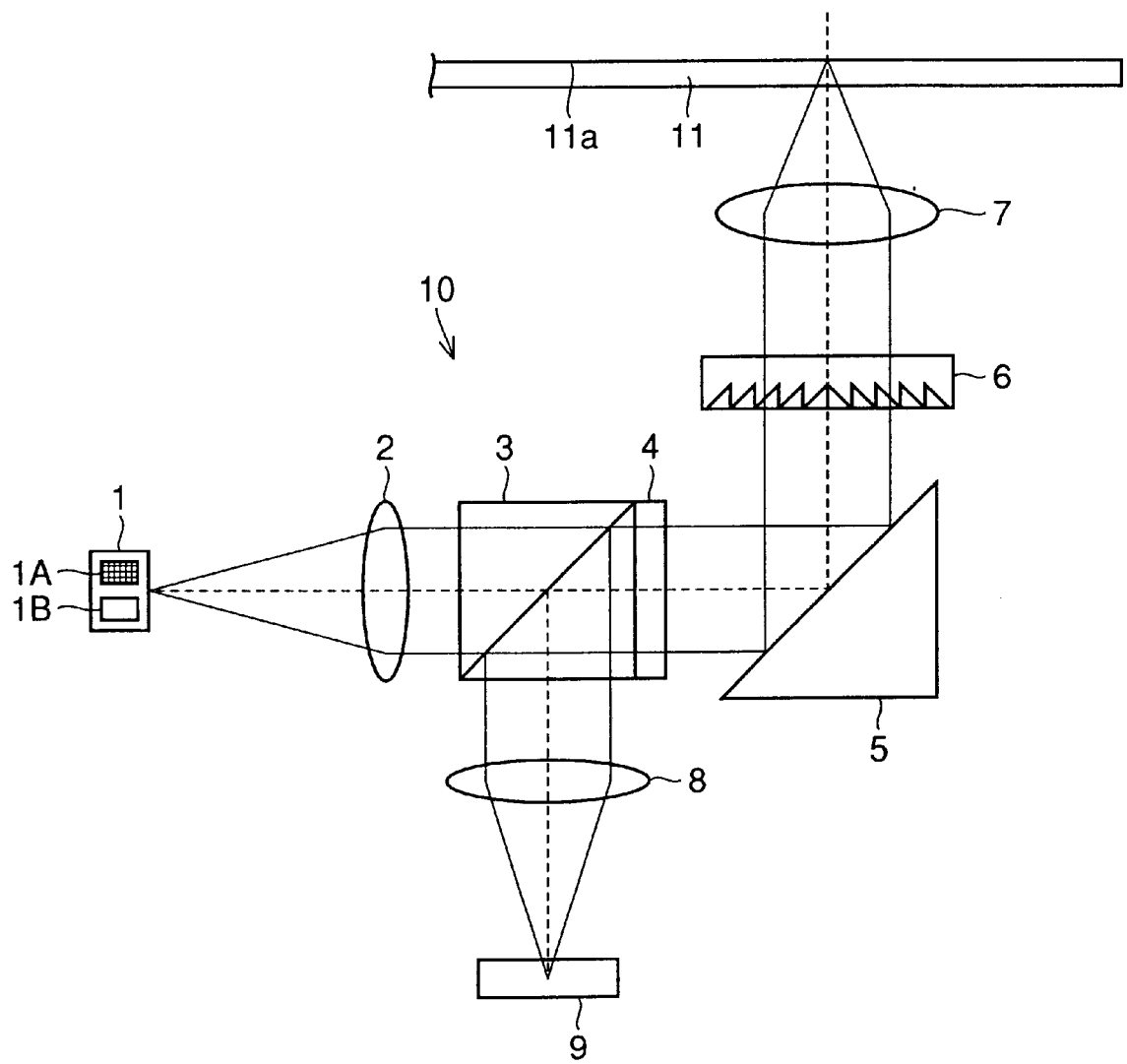
FIG. 6 is a diagram to describe the recording or reproduction operation of an optical disk having a substrate thickness of 0.6 mm using the optical pickup device of FIG. 1.

The operation of reproducing a signal from DVD 11 having a substrate thickness of 0.6 mm using optical pickup device 10 will be described with reference to FIG. 6. In the case of reproducing a signal from DVD 11, first semiconductor laser 1A of laser light source 1 is selectively driven. The laser beam of 635 nm in wavelength emitted from laser light source 1 is rendered parallel by collimator lens 2, and passes through polarization beam splitter 3. The light from polarization beam splitter 3 has its plane of polarization rotated 90 degrees by half-wave plate 4 to enter rising mirror 5. Here, the laser beam passes through polarization beam splitter 3 and half-wave plate 4 at the transmittance of approximately 98%. Therefore, there is little reduction in power by the passage through polarization beam splitter 3 and half-wave plate 4.

The laser beam incident on rising mirror 5 is reflected almost 100% and enters optical device 6. The laser beam passes through optical device 6 while maintaining its incident intensity and then enters objective lens 7. The laser beam is focused by objective lens 7 to be projected on signal recording plane 11a of DVD 11. The light reflected from signal recording plane 11a returns to half-wave plate 4 through objective lens 7, optical device 6 and rising mirror 5. The light has its plane of polarization rotates 90 degrees at half-wave plate 4, and then enters polarization beam splitter 3. The reflected light incident on polarization beam splitter 3 is reflected almost 100% at polarization beam splitter 3 to enter collective lens 8 since the plane of polarization is rotated 180 degrees than the case where the light enters polarization beam splitter 3 from collimator lens 2. The light in collective lens 8 is collected and directed to photodetector 9 for detection.

By using optical pickup device 10, a signal can be recorded and/or reproduced onto/from a magneto-optical recording medium that is a recordable optical disk. In this case, a signal can be recorded with the intensity of light equal to the level of the light immediately output from first semiconductor laser 1A.

Figure 7:
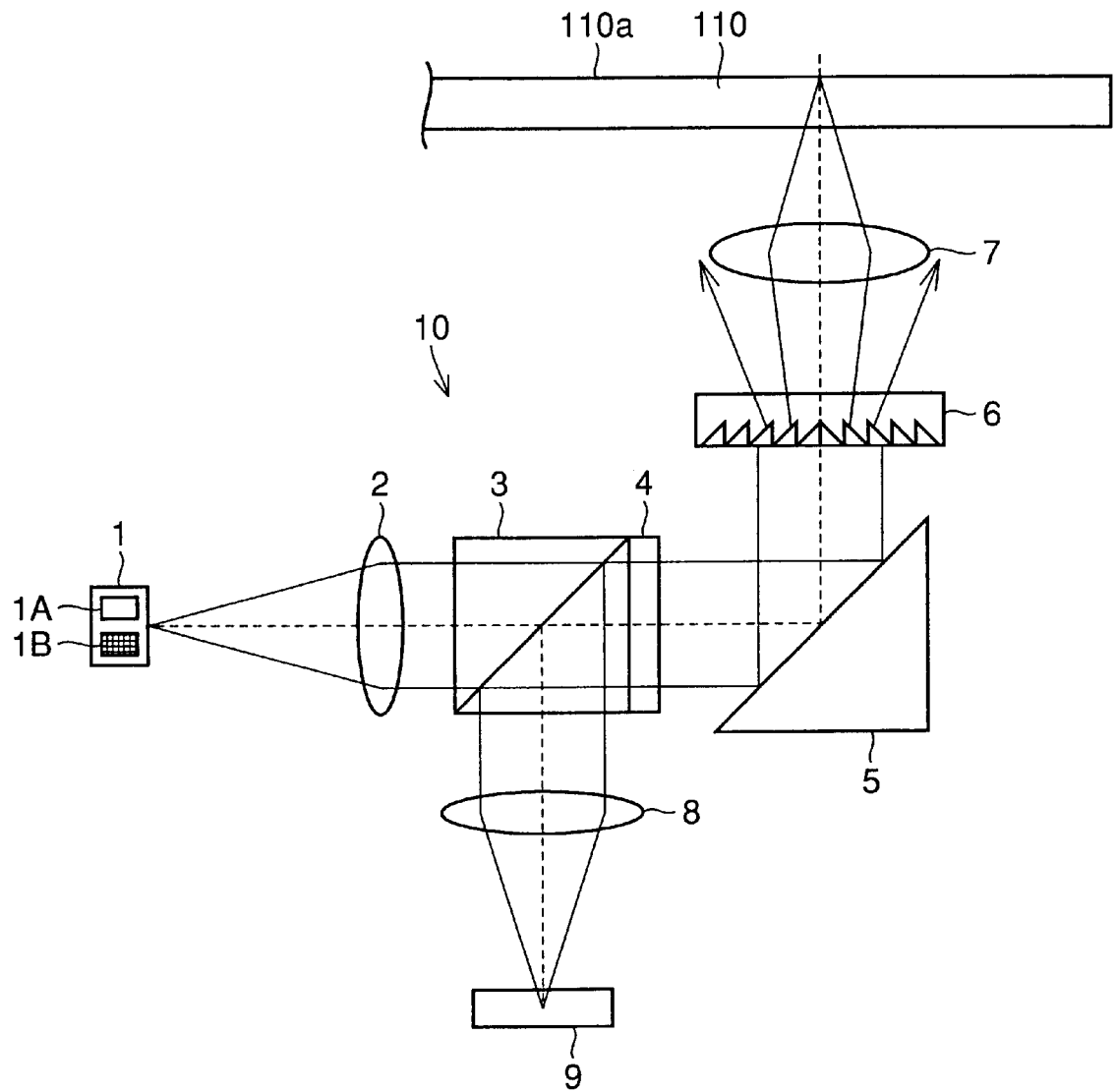
FIG. 7 is a diagram to describe the recording or reproduction operation of an optical disk having a substrate thickness of 1.2 mm using the optical pickup device of FIG. 1.

Referring to FIG. 7, the operation of recording and/or reproducing a signal onto and/or from a CD-R having a substrate thickness of 1.2 mm using optical pickup device 10 will be described hereinafter. In the recording and/or reproduction operation with respect to a CD-R, second semiconductor laser 1B of laser light source 1 is selectively driven.

First, the signal recording operation will be described. When a signal is to be recorded on a CD-R 110, a strong laser beam of 70 mW is output from second semiconductor laser 1B. The laser beam of 780 nm in wavelength output from laser light source 1 is rendered parallel by collimator lens 2 and passes through polarization beam splitter 3. At half-wave plate 4, the plane of polarization of the light is rotated 90 degrees and then enters rising mirror 5. The laser beam passes through polarization beam splitter 3 and half-wave plate 4 at the transmittance of approximately 98%. Therefore, there is little reduction in the power during passage of polarization beam splitter 3 and half-wave plate 4.

The laser beam entering rising mirror 5 is reflected almost 100% and enters optical device 6. The laser beam in optical device 6 is diffracted while maintaining its incident intensity. Only the predetermined inner portion of the laser beam enters objective lens 7. The laser beam in objective lens 7 is focused and projected onto signal recording plane 110a of CD-R 110. It is to be noted that the laser beam is modulated by the record signal. Therefore, a modulated laser beam of 780 nm in wavelength is projected onto signal recording plane 110a, whereby a signal is recorded.

The laser beam of 780 nm in wavelength emitted from second semiconductor laser 1B at the power of 70 mW has its intensity reduced by approximately 2% by passage through polarization beam splitter 3 and half-wave plate 4, and enters optical device 6. The laser beam is diffracted and transmitted through optical device 6 while maintaining its intensity. Only the predetermined center portion of light enters objective lens 7. The predetermined center portion is the region where the effective numerical aperture of objective lens 7 of the numerical aperture of 0.6 is in the range of 0.50–0.53. When the effective light flux of the laser beam of 780 nm in wavelength is 4.46 mm, the diameter of the predetermined center portion where the effective numerical aperture of objective lens 7 is in the range of 0.50–0.53 is 3.2–3.4 mm. Therefore, the intensity of the laser beam incident on objective lens 7 is 70 mW ×0.98 ×(center portion diameter effectively used/effective light flux of laser beam) =49~52 mW. Therefore, by using optical pickup device 10, a laser beam of 780 nm in wavelength can be projected on signal recording plane 110 a of CD-R 110 with little reduction in the intensity level to that right after emission from second semiconductor laser 1B. Therefore, signal recording can be carried out correctly.

Next, the operation of signal reproduction will be described. When a signal is to be reproduced from CD-R 110, a laser beam of 12 mW is emitted from second semiconductor laser 1B. The laser beam of 780 nm emitted from laser source 1 is directed to signal recording plane 110 of CD-R 110 with little reduction in the intensity, as described above. The reflected light from signal recording plane 110 a is guided to photodetector 9 as described with reference to FIG. 6, and a signal is reproduced.

Figure 8:
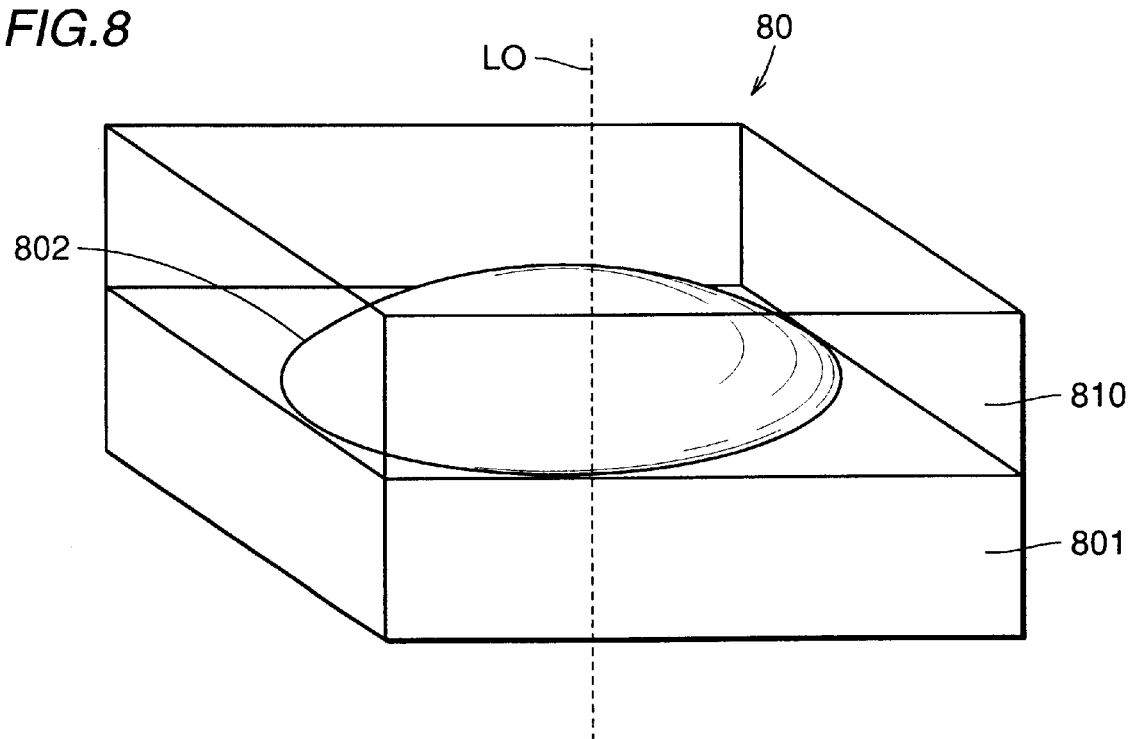
FIG. 8 is a prospective view of another optical device of the present invention.

Another optical device 80 employed in optical pickup device 10 will be described with reference to FIG. 8. Optical device 80 includes a transparent first optical member 810 and a transparent second optical member 801. First optical member 810 is arranged at the objective lens 7 side, and has a concave curve plane 802 in contact with second optical member 801. Second optical member 801 is arranged at the light source 1 side, and has a convex curve plane 802 in contact with first optical member 810. Second optical member 802 has a refractive index of 2.3 for a laser beam of 635 nm in wavelength and a refractive index of 1.8 for a laser beam of 780 nm in wavelength. First optical member 810 has the same refractive index of 2.3 for a laser beam of 635 nm in wavelength and a laser beam of 780 nm in wavelength. Second optical member 801 is formed of, for example, SiN. First optical member is formed of, for example, $TiO_2$.

Figure 9:
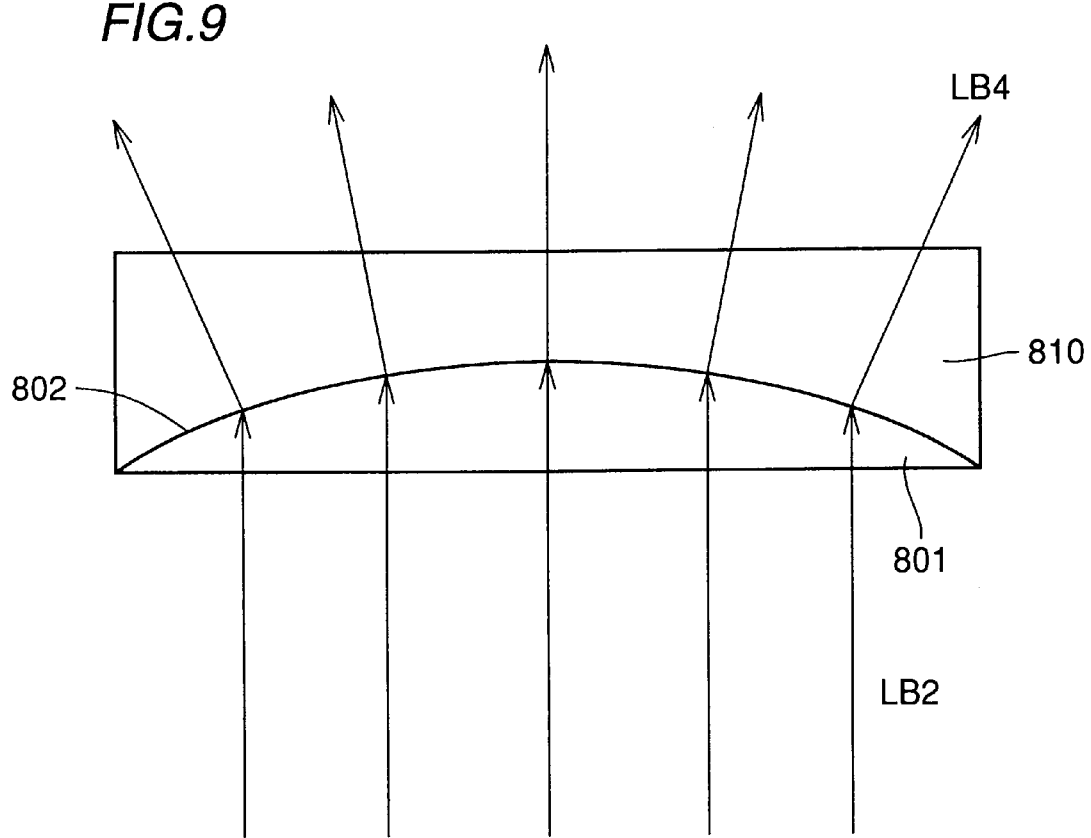
FIG. 9 is a cross sectional view of the optical device of FIG. 8.

The cross sectional shape of optical device 80 at an arbitrary plane including optical axis L0 will be described with reference to FIG. 9. The interface 802 between first optical member 810 and second optical member 801 has a dome-like aspheric surface protruding towards first optical member 810. Although interface 802 maybe a spheric surface, it is desirable to correct the spheric surface slightly to reduce aberration. Since first and second optical members 810 and 801 have the same refractive index 2.3 with respect to a laser beam of 635 nm in wavelength, the laser beam of 635 nm will not be diffracted by optical device 80 and is transmitted directly through optical device 80. In contrast, the second optical member 801 has a refractive index of 1.8 and the first optical member 810 has a refractive index of 2.3 with respect to a laser beam of 780 nm in wavelength. Since the interface 802 between first and second optical members 810 and 801 has a dome-like aspheric surface as described above, laser beam LB2 of 780 nm in wavelength is diffracted outwards from the optical axis at optical device 80 and output therefrom as diffracted light LB4. In this case, the intensity of laser beam LB2 is substantially equal to that of diffracted light LB4.

Reproduction of a DVD and recording and/or reproduction of a CD-R can be carried out as described above even in the case where optical device 80 is used instead of optical device 6 of optical pickup device 10.

Specific examples of first optical members 601 and 810 and second optical members 61 and 801 forming optical devices 6 and 80 are not limited to those described above. In the case of optical device 6, first and second optical members 60 and 61 have the same first refractive index n1 with respect to a laser beam of 635 nm in wavelength, and first optical member 60 and second optical member 61 have a first refractive index n1 and a second refractive index n2 smaller than the first refractive index n1, respectively, with respect to a laser beam of 780 nm in wavelength.

When in the case of optical device 80, first and second optical members 810 and 801 have the same first refractive index n1 for a laser beam of 635 nm in wavelength, and first and second optical members 810 and 801 have the first refractive index n1 and the second refractive index n2 smaller than the first refractive index n1, respectively, with respect to the laser beam of 780 nm.

Although the substrate portion of the first optical member 60 and projection 602 are formed separately in optical device 6, they may be formed integrally of the same material. Similarly, optical device 80 may have the substrate portion of second optical member 801 and the dome-like projection of second apparatus member 801 formed integrally of the same material.

In other words, optical devices 6 and 80 are arbitrary as long as a laser beam can be diffracted selectively in a desired direction while maintaining incident intensity corresponding to the wavelength of the laser beam.

Also, the semiconductor laser mounted in optical pickup device 10 is not limited to that emitting a laser beam of 635 nm in wavelength and a laser beam of 780 nm in wavelength. A semiconductor laser that emits laser beams of two other different wavelengths can be employed.

Furthermore, the optical pickup device of the present invention is not limited to that emitting laser beams of two different wavelengths. One that emits a laser beam of one wavelength can be used.

Figure 10:
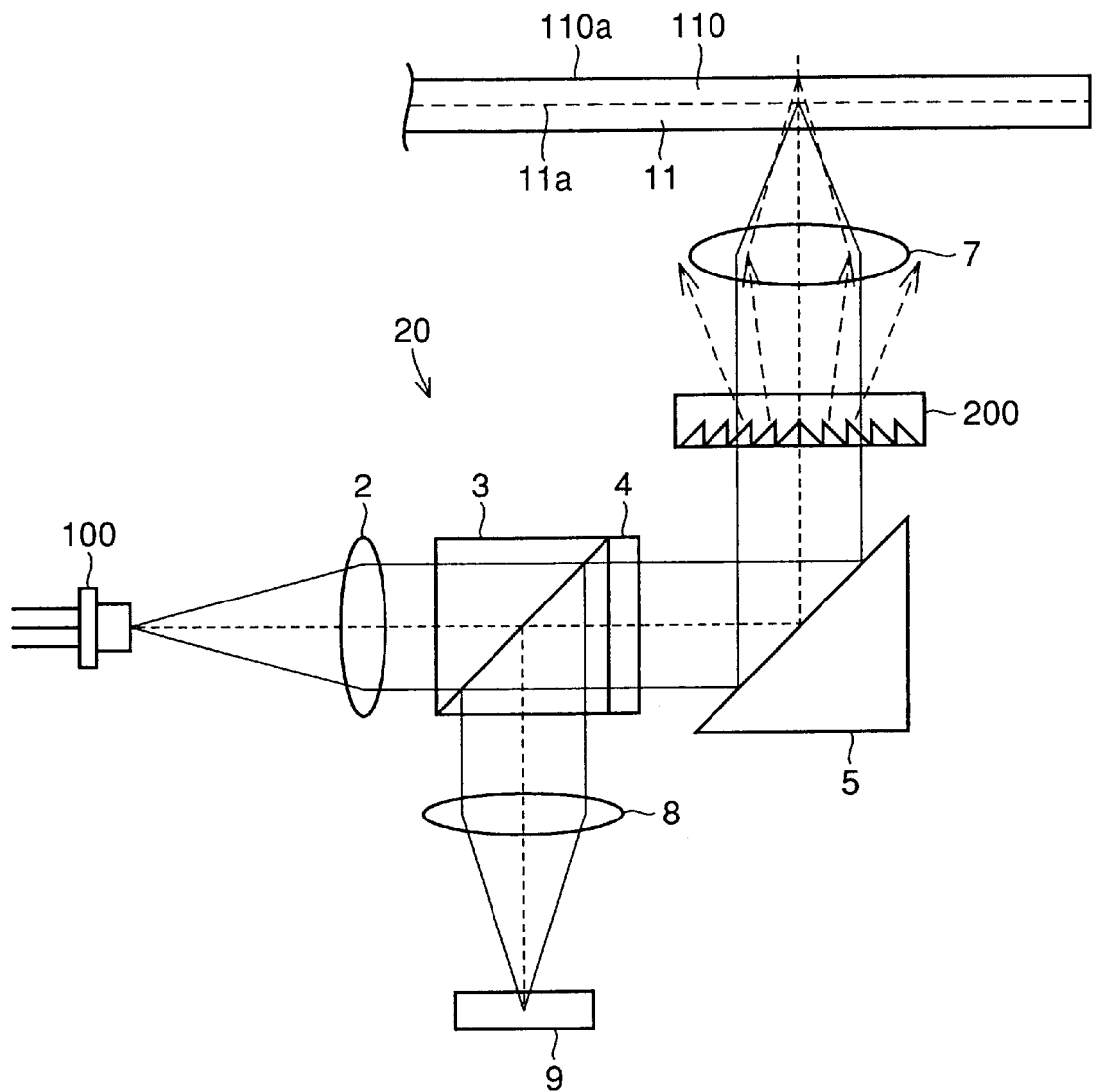
FIG. 10 shows a structure of another optical pickup device of the present invention.

Referring to FIG. 10, a structure of another optical pickup device 20 according to the present invention will be described. Optical pickup device 20 has a structure similar to that of optical pickup device 10, provided that a laser beam source 100 and an optical device 200 are employed instead of laser light source 1 and optical device 6, respectively. Laser light source 100 generates only a laser beam of 635 nm in wavelength.

Figure 11:
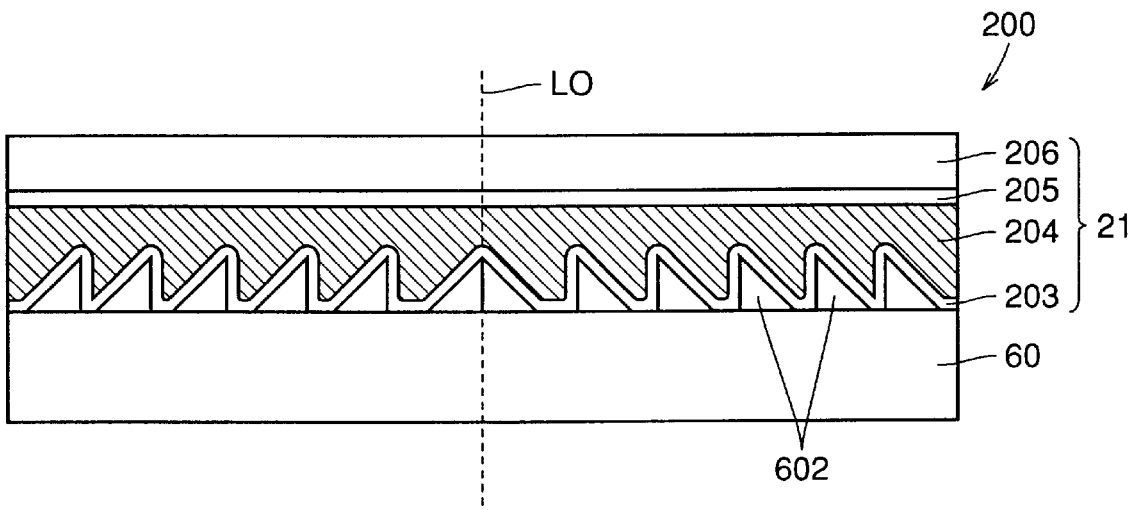
FIG. 11 is a cross sectional view of the optical device of FIG. 10.

The structure of optical device 200 will be described with reference to the cross sectional view of FIG. 11. Optical device 200 includes a first optical member 60 and a second optical member 21. Second optical member 21 includes a first transparent electrode 203 formed on annular projections 602, a TN (Twisted Nematic) type liquid crystal 204 formed thereon, a second transparent electrode 205 formed further thereon, and a transmittive substrate 206. First optical member 60 is identical to that described previously.

TN type liquid crystal 204 is sealed between first and second transparent electrodes 203 and 205 so that the molecular arrangement is not twisted 90 degrees. Therefore, the plane of polarization of the laser beam passing through TN type liquid crystal 204 will not be rotated 90 degrees.

The optical property of optical device 200 will be described with reference to FIGS. 12 and 13. Annular projections 203 forming a hologram have a refractive index of 1.7 with respect to a laser beam of 635 nm in wavelength. TN liquid crystal 204 has a refractive index of 1.5 when voltage is not applied across first and second transparent electrodes 203 and 205, and has a refractive index of 1.7 when voltage is applied.

Figure 12:
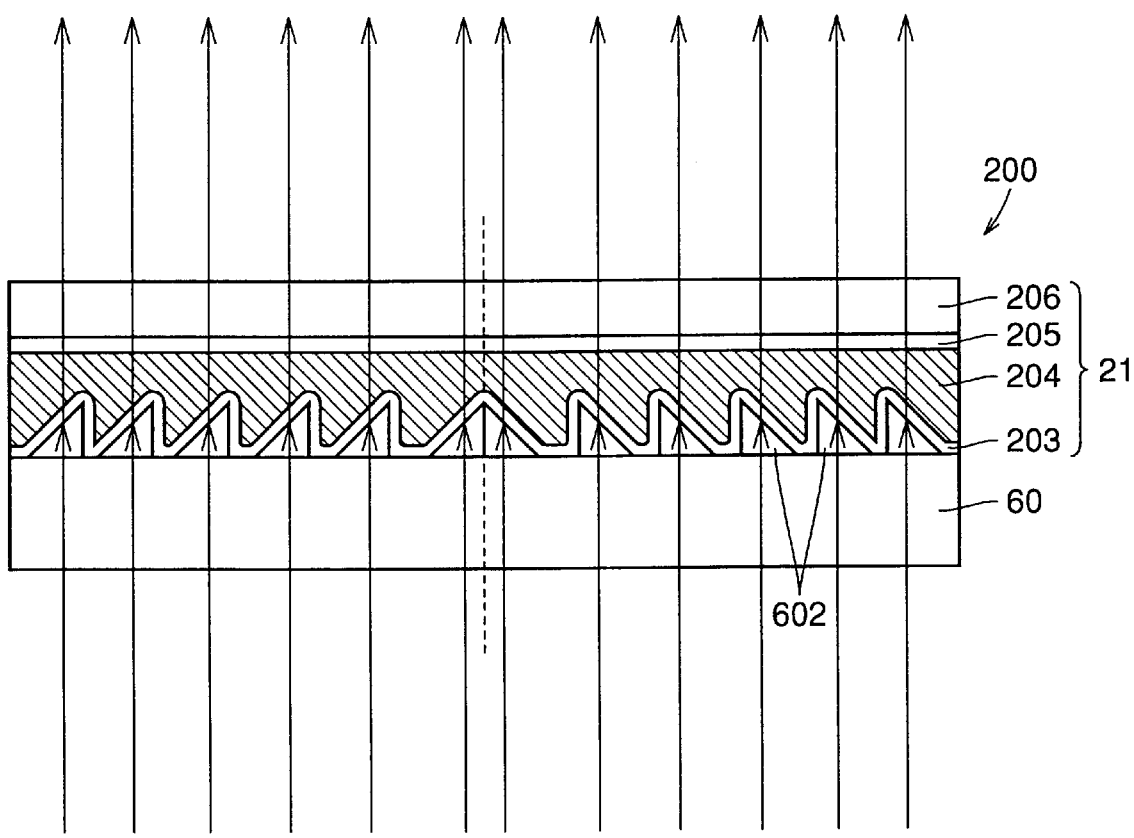
FIG. 12 is a diagram to describe the property of the optical device of FIG. 10 when voltage is applied.

Referring to FIG. 12, the laser beam of 635 nm in wavelength directly passes through optical device 200 when voltage is applied to TN liquid crystal 204 since projections 602 forming the hologram and TN liquid crystal 204 have the same refractive index 1.7.

Figure 13:
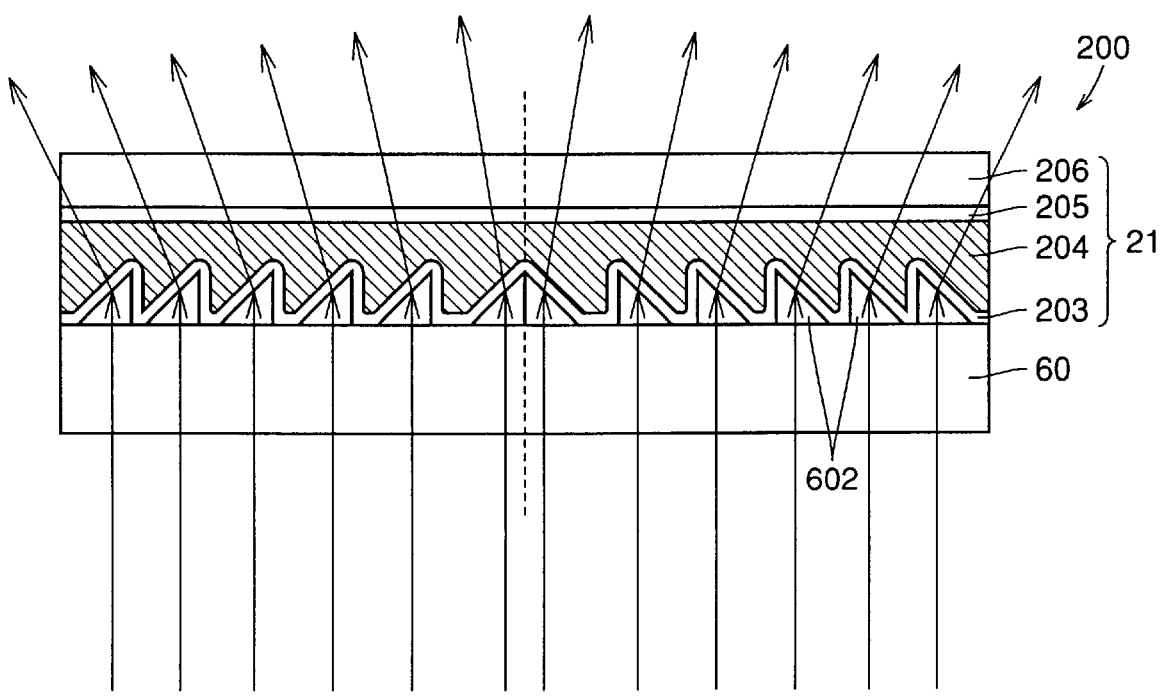
FIG. 13 is a diagram to describe the property of the optical device of FIG. 10 when voltage is not applied.

Referring to FIG. 13, the laser beam of 635 nm in wavelength is diffracted in a desired direction to be transmitted from optical device 200 when voltage is not applied to liquid crystal 204 since projections 602 forming the hologram and TN type liquid crystal 204 have the refractive index of 1.7 and 1.5, respectively, and projection 602 has a gentle slope.

Optical device 200 diffracts the laser beam in a desired direction while maintaining the incident intensity by selectively applying voltage to TN liquid crystal 204 irrespective of the wavelength of the laser beam.

Figure 14:
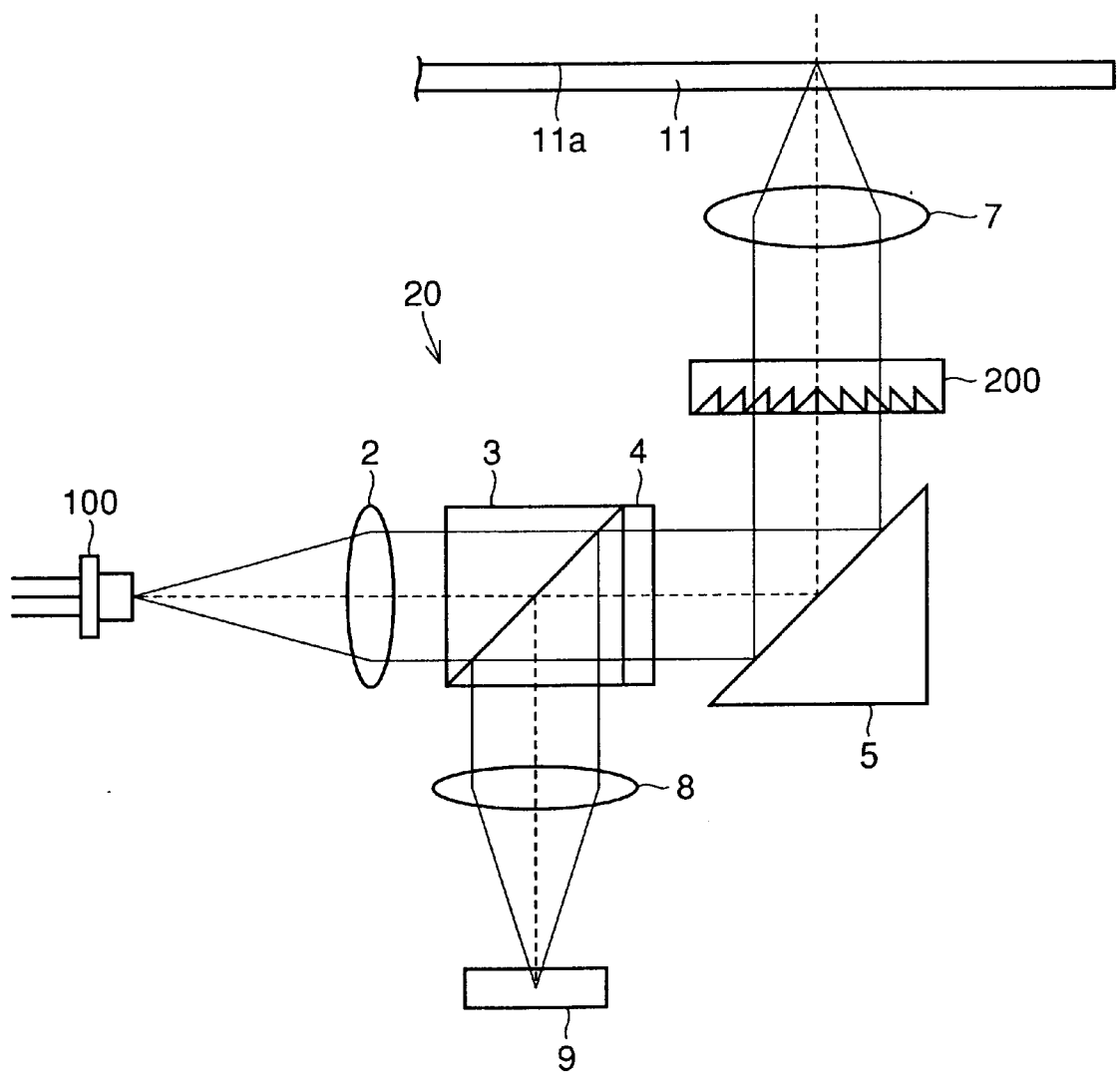
FIG. 14 is a diagram to describe the recording or reproduction operation of an optical disk having a substrate thickness of 0.6 mm using the optical pickup device of FIG. 10.

Referring to FIG. 14, reproduction of DVD 11 having a substrate thickness of 0.6 mm will be described. In reproducing a signal from DVD 11, voltage is applied to first and second transparent electrodes 203 and 205 of optical device 200. As a result, the laser beam of 635 nm in wavelength emitted from laser light source 100 is rendered parallel by collimator lens 2 and passes through polarization beam splitter 3. The laser beam has its plane of polarization rotated 90 degrees by half-wave plate 4 and enters rising mirror 5. There is little reduction in the power of the laser beam by the passage of polarization beam splitter 3 and half-wave plate 4 since the laser beam is transmitted through polarization beam splitter 3 and half-wave plate 4 at the transmittance of approximately 98%.

The laser beam incident to rising mirror 5 is reflected almost 100% to enter optical device 200. The laser beam incident to optical device 200 is directly transmitted maintaining the incident intensity to enter objective lens 7. The laser beam in objective lens 7 is focused to be projected on signal recording plane 11a of DVD 11. The light reflected from signal recording plane 11a passes through objective lens 7, optical device 200 and rising mirror 5 to return to half-wave plate 4. The light has its plane of polarization rotated 90 degrees at half-wave plate 4 and then enters polarization beam splitter 3. The reflected light entering polarization beam splitter 3 is reflected almost 100% thereat to enter collective lens 8 since the plane of polarization is rotated 180 degrees than the case where the light beam enters polarization beam splitter 3 from collimator lens 2. Then, the light is focused at collective lens 8 to be directed to photodetector 9 for detection.

Figure 15:
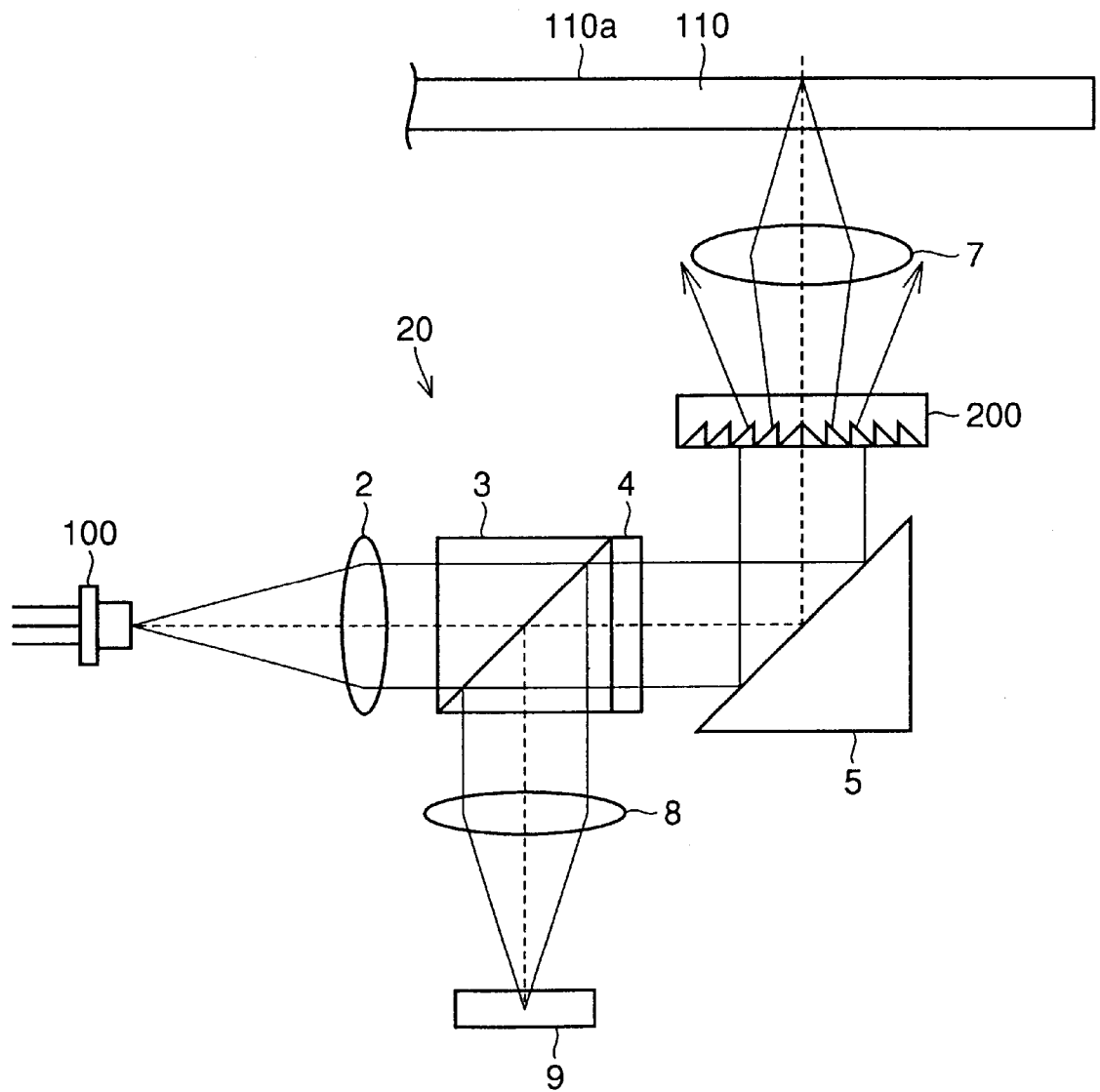
FIG. 15 is a diagram to describe the reproduction operation of an optical disk having a substrate thickness of 1.2 mm using the optical pickup device of FIG. 10.

Reproduction from CD 110 having a substrate thickness of 1.2 mm will be described with reference to FIG. 15. In reproducing a signal from CD 110, voltage is not applied to first and second transparent electrodes 203 and 205 of optical device 200. As a result, the laser beam of 635 nm in wavelength emitted from laser light source 100 is rendered parallel by collimator lens 2 and passes through polarization beam splitter 3. The light has its plane of polarization rotated 90 degrees at half-wave plate 4 to enter rising mirror 5. The laser beam is hardly reduced in power by passage through polarization beam splitter 3 and half-wave plate 4 since the laser beam is transmitted through polarization beam splitter 3 and half-wave plate 4 at the transmittance of approximately 98%.

The laser beam incident to rising mirror is reflected almost 100% and enters optical device 200. The laser beam incident to optical device 200 is diffracted in a desired direction while maintaining the incident intensity. Only the predetermined center portion of the laser beam enters objective lens 7. The incident laser beam to objective lens 7 is collected at objective lens 7 to be projected on signal recording plane 110a of CD 110. In this case, the diameter of the predetermined center portion is determined so that the effective numerical aperture of objective lens 7 is in the range of 0.3 to 0.4. As a result, the laser beam of 635 nm in wavelength is projected onto signal recording plane 110a of CD 110 having a substrate thickness of 1.2 mm with almost no aberration. The light reflected from signal recording plane 110a is detected by photodetector 9 in a manner similar to that described above.

Figure 16:
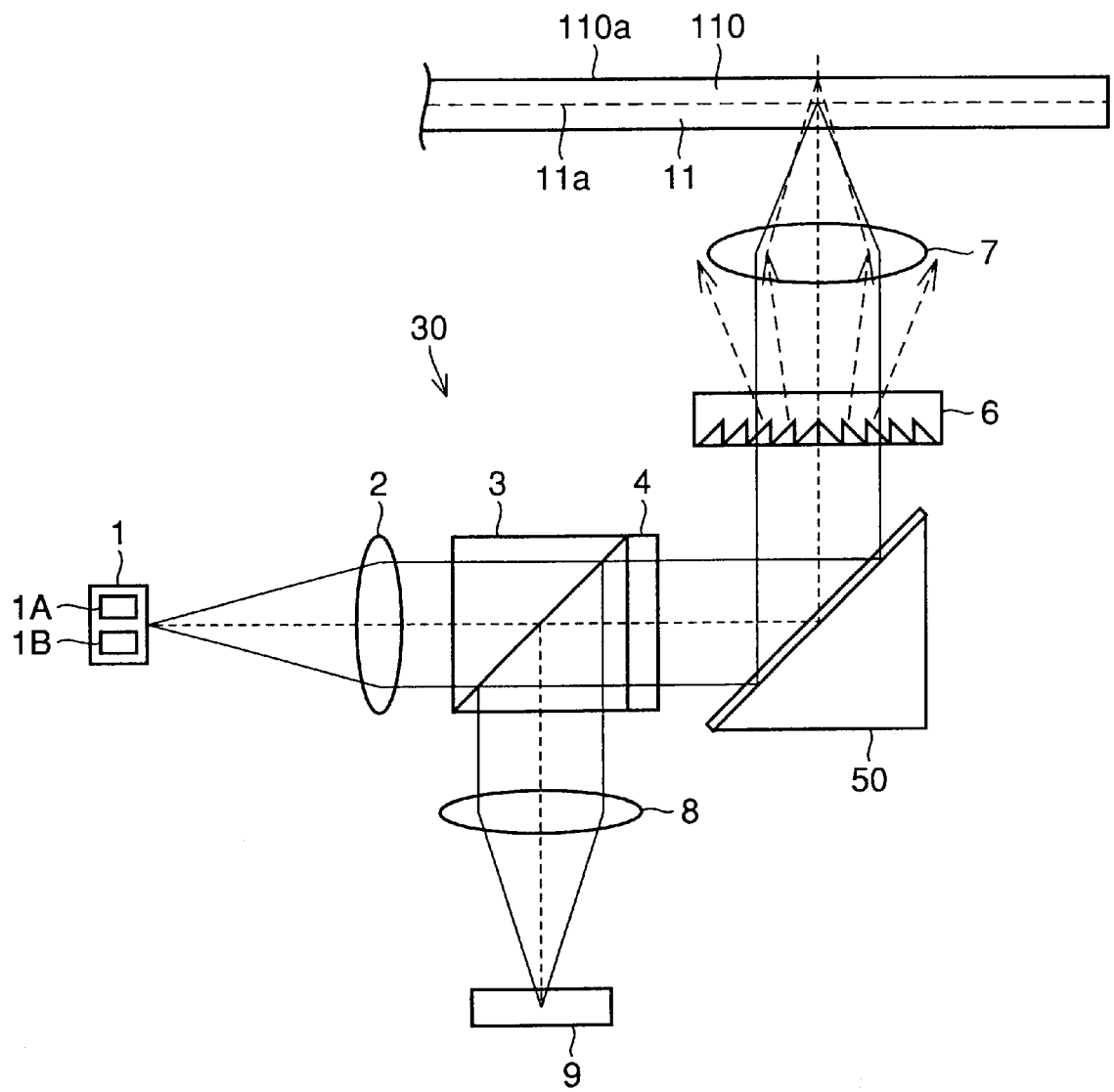
FIG. 16 shows a structure of a further another optical pickup device of the present invention.

Referring to FIG. 16, an optical pickup device 30 which is an improvement of optical pickup device 10 of FIG. 1 will be described. Optical pickup device 30 includes a rising mirror 50 instead of rising mirror 5 of optical pickup device 10. The remaining structure is similar to that of optical pickup device 10. The details of rising mirror 50 disclosed in Japanese Patent Application No. 10-257130 will be described briefly hereinafter.

Figure 17:
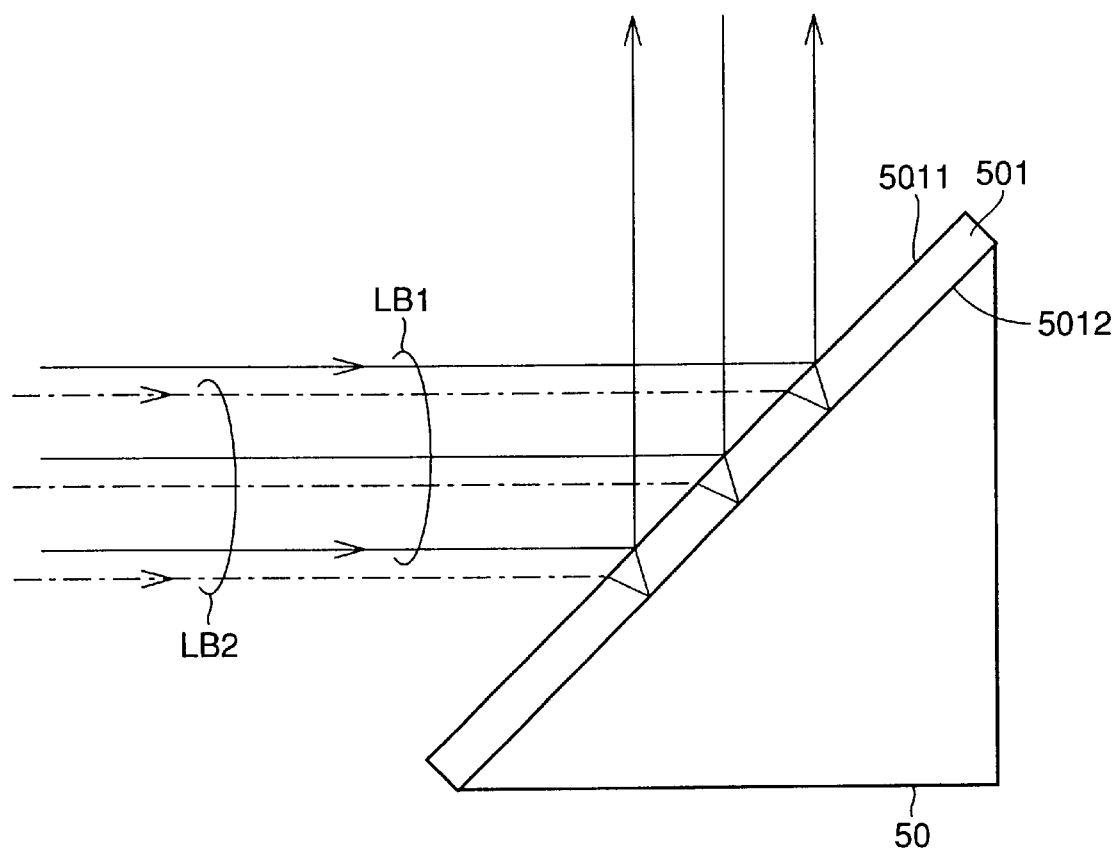
FIG. 17 is a diagram to describe the rising mirror of FIG. 16.

Referring to FIG. 17, rising mirror 50 includes a thin film 501 that sets the optical axes of two laser beams LB1 and LB2 in coincidence at its surface. Since laser light source 1 has a first semiconductor laser 1A and a second semiconductor laser 1B, the optical axes of laser beams LB1 and LB2 emitted from the two semiconductor lasers will be deviated from each other. Therefore, it is necessary to set the optical axes of the two laser beams LB1 and LB2 in coincidence in order to carry out recording and reproduction of a signal correctly.

Optical pickup device 30 uses rising mirror 50 including a thin film 50 to set the optical axis of laser beam LB1 of 635 nm in wavelength and the optical axis of laser beam LB2 of 780 nm in wavelength in coincidence.

Laser beam LB1 of 635 nm in wavelength is reflected at a first plane 5011 of thin film 501 of rising mirror 50. Laser beam LB2 of wavelength 780 nm is refracted at first plane 5011 of thin film 501 of rising mirror 50 and reflected at a second plane 5012 to be refracted again at first plane 5011 to be output from rising mirror 50 as a laser beam having an optical axis identical to that of the reflected light of the laser beam of 635 nm in wavelength.

The passage of rising mirror 50 allows the optical axes of the laser beams LB1 and LB2 of the two wavelengths to match each other without reduction in the intensity of the laser beam. Therefore, a signal can be recorded and/or reproduced more accurately.

Optical devices 6, 80 and 200 described above are located at an arbitrary position between laser light source 1 and objective lens 7.

The above-described optical pickup devices 10, 20 and 30 of the present invention diverts the circumferential portion of the laser beam outside objective lens 7 in the recording and reproducing operation with respect to CD-Rn 110 using optical devices 6, 80 and 200. This means that there is a relatively large loss. In order to output a laser beam having sufficient power from objective lens 7, the output power of laser light sources 1 and 100 or the numerical aperture of collimator lens 2 and objective lens 7 should be increased. However, increase thereof has a limit. A greater power is required for the laser beam output from objective lens 7 as the data reading or writing speed increases. Also, it is to be noted that the effective region of collimator lens 2 and objective lens 7 is a true circle whereas the laser beam output from laser light source 1 has a cross section of an ellipse, not a true circle. If the entire laser beam in the direction of the longer diameter is made to be incident on the effective region of collimator lens 2 or objective lens 7, there will be an effective region that is not used in collimator lens 2 and objective lens 7 in the direction of the shorter diameter. If the laser beam in the direction of the shorter diameter is made to be incident on the entire effective region of collimator lens 2 or objective lens 7, the laser beam in the direction of the longer diameter will be wasted partially. In general, if the design of the focal length of collimator lens 2 is made short so that laser light source 1 or 100 is located close to collimator lens 2, the power of the laser beam output from objective lens 7 will become greater. However, the spot diameter of the laser beam formed on optical disk 11 (or 110) will become too large. Therefore, the rim intensity defined below must be set appropriately in order to obtain sufficient output power while meeting various recording or reproduction conditions.

Figure 18:
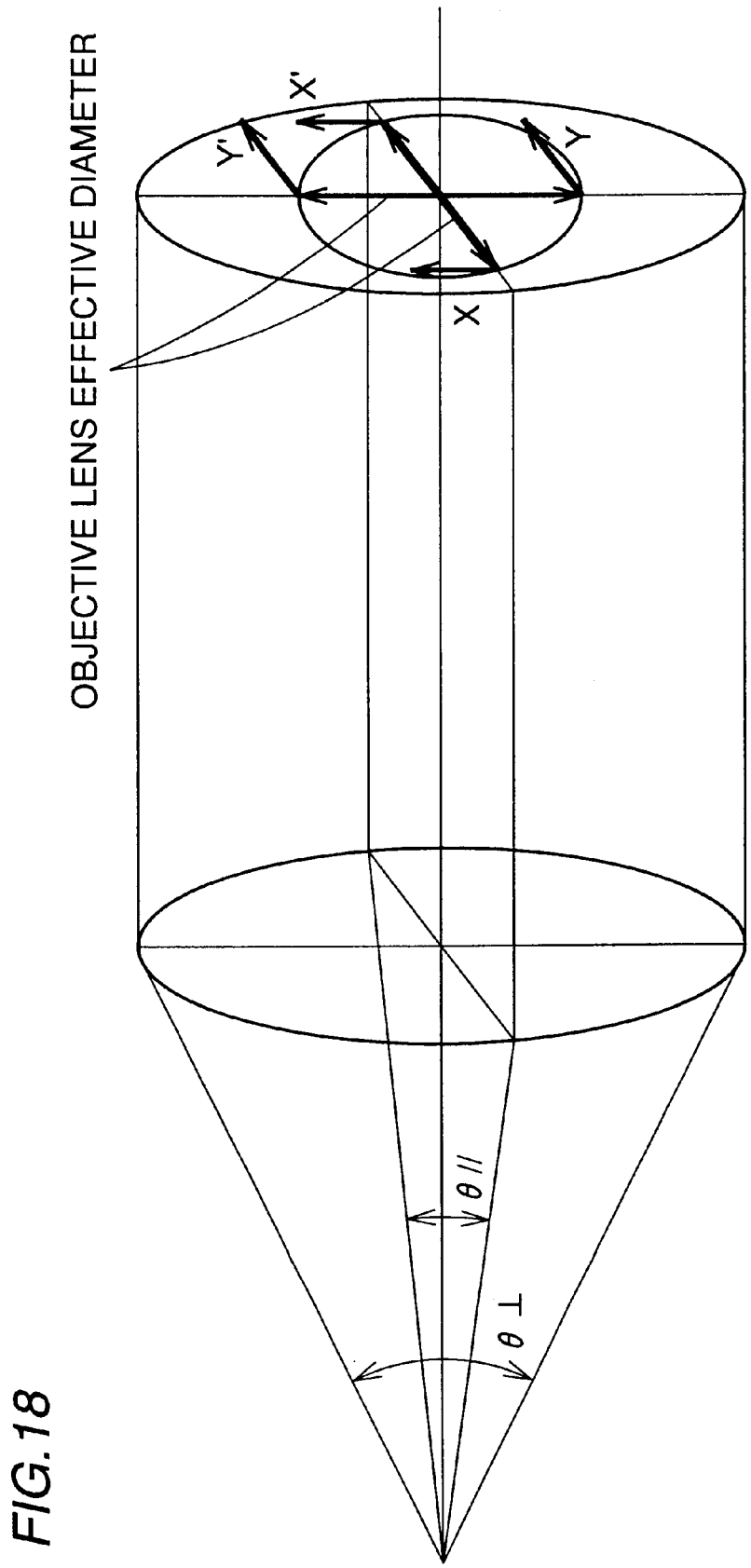
FIG. 18 is a perspective view of a laser beam emitted from a laser light source, rendered parallel by the collimator lens, and entering the objective lens.

As shown in FIG. 18, the laser beam output from the laser light source is increased in diameter to enter the collimator lens. The laser beam is rendered parallel by the collimator lens, and then enters the objective lens. Here, the broadening angle θ// in the direction of the shorter diameter is smaller than the broadening angle θ⊥ in the direction of the longer diameter.

Figure 19:
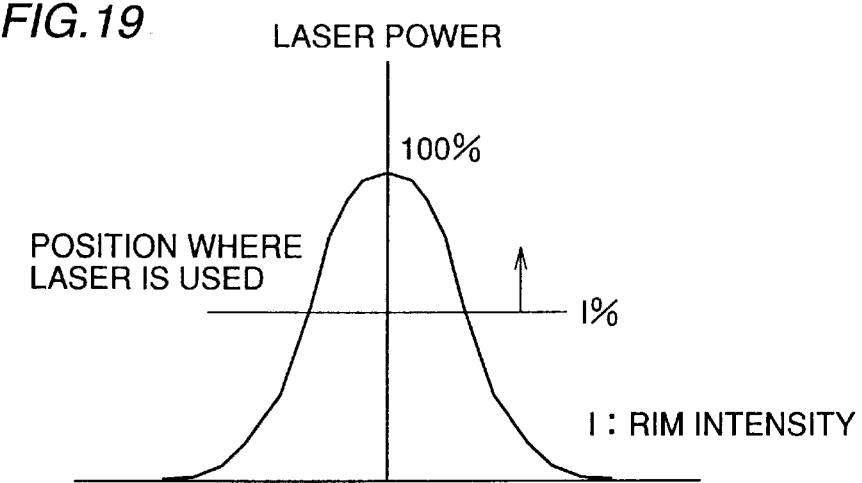
FIG. 19 shows the intensity distribution of the laser beam of FIG. 18.

The intensity of the laser beam corresponds to a Gaussian distribution as shown in FIG. 19. The intensity is highest at the center and becomes lower towards the outer circumference. Since the laser intensity forms a Gaussian distribution, a laser beam of at least a predetermined intensity will be used in practical usage. If the maximum laser power is 100%, the rim intensity I % is defined when laser of at least I % is used.

Figure 20:
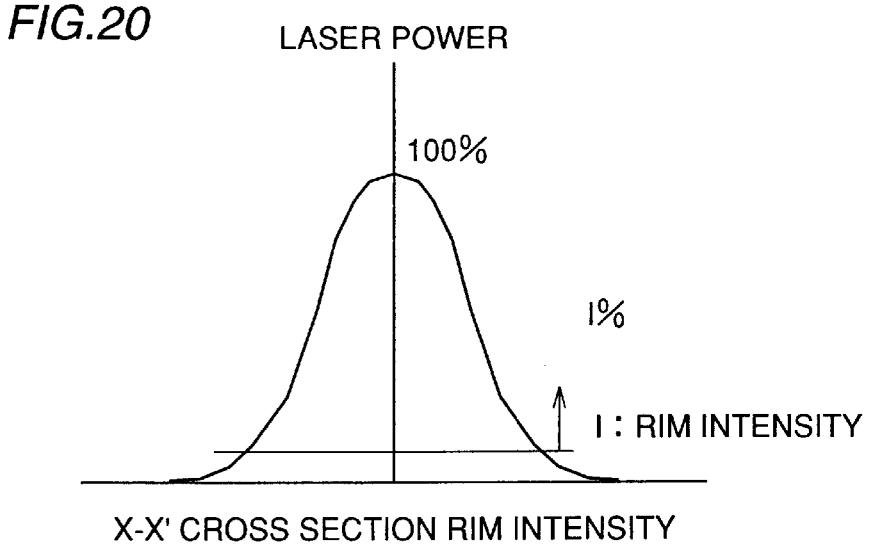
FIG. 20 shows the intensity distribution of the laser beam along cross section X–X' of FIG. 18.
Figure 21:
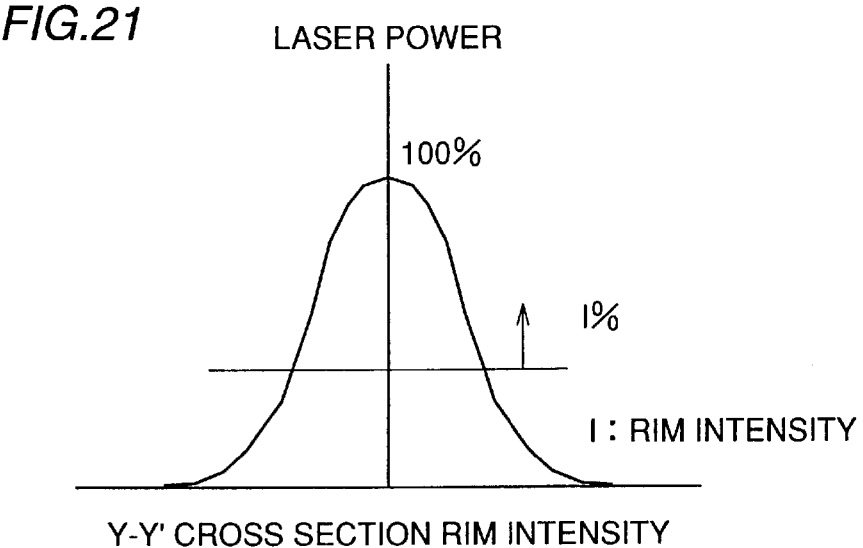
FIG. 21 shows the intensity distribution of the laser beam along cross section Y–Y' of FIG. 18.

Since the laser beam has a cross section of an ellipse, the intensity distribution is abrupt in the shorter diameter direction (X–X') as shown in FIG. 20 and gentle in the longer diameter direction (Y–Y') as shown in FIG. 21. Since the effective region of the objective lens corresponds to a true circle, the rim intensity becomes smaller in the shorter diameter direction as shown in FIG. 20 and higher in the longer diameter direction as shown in FIG. 21.

The simulation result of the output power when the kinoform type optical device 6 of the present invention shown in FIG. 3A is employed will be described in comparison with the output power when the conventional stepped optical device shown in FIG. 4C is employed.

Figure 22:
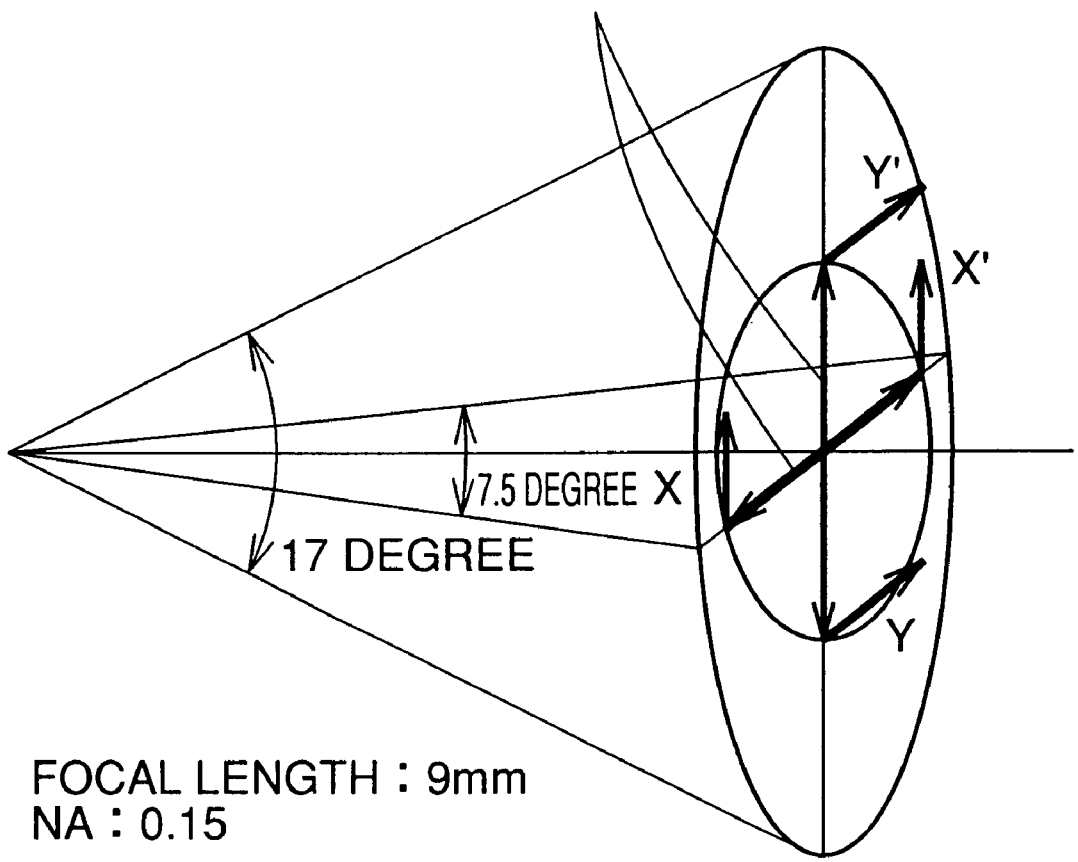
FIG. 22 is a diagram to describe the rim strength when the priority is given on the efficiency.
Figure 23:
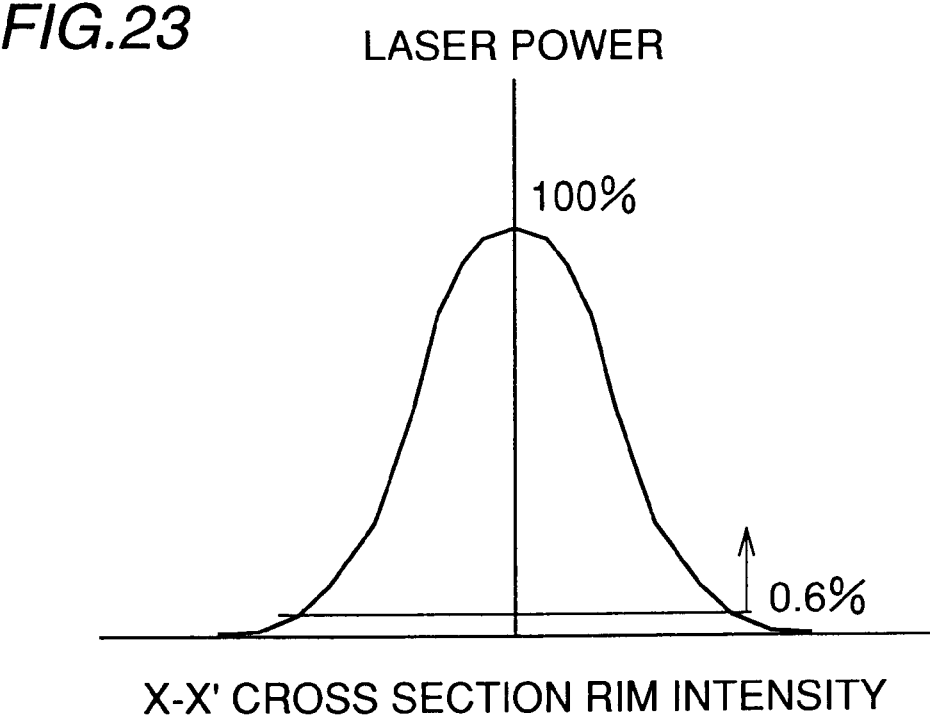
FIG. 23 shows the intensity distribution of the laser beam along cross section X—X of FIG. 22.
Figure 24:
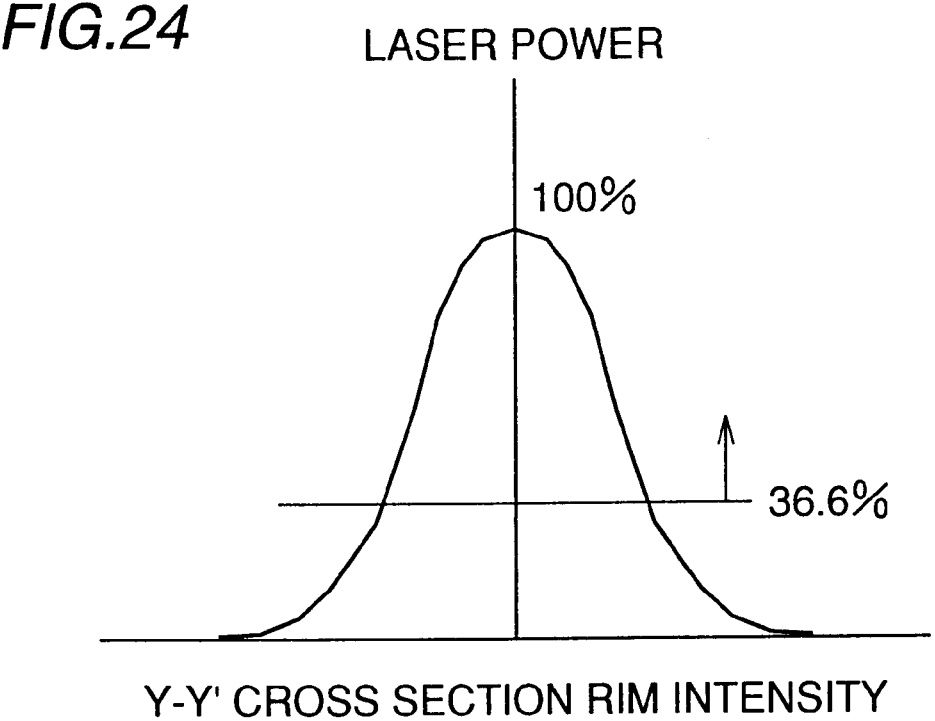
FIG. 24 shows the intensity distribution of the laser beam along cross section Y–Y' of FIG. 22.

First, an example of the rim intensity when priority is given on efficiency will be described. As shown in FIG. 22, a laser light source having a broadening angle of 7.5° in the shorter diameter direction and a broadening angle of 17° in the longer diameter direction is used. A collimator lens having a numerical aperture NA of 0.15 with a focal length f of 9 mm is employed. The case is considered where the rim intensity is set to 0.6% in the shorter diameter direction as shown in FIG. 23 and to 36.6% in the longer diameter direction as shown in FIG. 24.

By setting the effective numerical aperture NA of the objective lens to 0.5, the output power of the laser light source to 70 mW and the other parameters to appropriate values as shown in Table 1 below, the output power from the objective lens becomes 49.90 mW when the kinoform type optical device 6 is employed.

TABLE 1

Priority on Efficiency (New HOE)

| Pickup Design Calculation Condition | | | | Calculated value | |
|---|---|---|---|---|---|
| 1. Objective lens | NA 0.5 | f = 3.2 | Transmittance 95% | Objective lens effective diameter | 3.20 mm |
| | | | | Collimator lens NA | At least 0.18 |
| 2. Collimator lens | NA 0.15 | f = 9 mm | Transmittance 95% | Optical Magnification | 2.81 times |
| | | | | Lens bond angle | 20.48 deg |
| 3. Laser | Wavelength 780 nm | CW 70 mW | Pulse 0 mW | Lens bond efficiency | 82.24% |
| | θ// 7.5 deg | θ ⊥ 17 deg | | effective θ//angle | 7.50 deg |
| | | | | effective θ ⊥ angle | 17.00 deg |
| 4. Beam formation magnification | θ// 1 time | θ ⊥ 1 time | Transmittance 100% | | |
| 5. Beam splitter | Tp 100% | | Transmittance 98% | Pick efficiency | 71.28% |
| | | | | CW output power | 49.90 mW |
| 6. HOE | Spectral ratio 100% | | Transmittance 100% | Pulse output power | 0.00 mW |
| | | | | Rim intensity θ// | 0.57% |
| 7. Rising mirror | | | Transmittance 98% | Rim intensity θ ⊥ | 36.57% |
| | θ//direction | θ ⊥ direction | | | |
| Rim intensity | 0.6% | 36.6% | | | |
| Eclipse coefficient | 1.60 | 0.71 | | | |
| Expected spot diameter | 1.460 μm | 1.384 μm | | | |

If the effective numerical aperture NA of the objective lens is increased to 0.53 as shown in Table 2, the output power is boosted to 51.65 mW.

TABLE 2

Priority on Efficiency (New HOE)

| Pickup Design Calculation Condition | | | | Calculated value | |
|---|---|---|---|---|---|
| 1. Objective lens | NA 0.53 | f = 3.2 | Transmittance 95% | Objective lens effective diameter | 3.39 mm |
| | | | | Collimator NA | At least 0.19 |
| 2. Collimator lens | NA 0.15 | f = 9 mm | Transmittance 95% | Optical Magnification | 2.81 times |
| | | | | Lens bond angle | 21.72 deg |
| 3. Laser | Wavelength 780 nm | CW 70 mW | Pulse 0 mW | Lens bond efficiency | 85.13% |
| | θ// 7.5 deg | θ⊥ 17 deg | | effective θ//angle | 7.50 deg |
| | | | | effective θ⊥ angle | 17.00 deg |
| 4. Beam formation magnification | θ// 1 time | θ⊥ 1 time | Transmittance 100% | | |
| 5. Beam splitter | Tp 100% | | Transmittance 98% | Pick efficiency | 73.79% |
| | | | | CW output power | 51.65 mW |
| 6. HOE | Spectral ratio 100% | | Transmittance 100% | Pulse output power | 0.00 mW |
| | | | | Rim intensity θ// | 0.30% |
| 7. Rising mirror | | | Transmittance 98% | Rim intensity θ⊥ | 32.24% |
| | θ//direction | θ⊥ direction | | | |
| Rim intensity | 0.3% | 32.2% | | | |
| Eclipse coefficient | 1.70 | 0.76 | | | |
| Expected spot diameter | 1.378 μm | 1.314 μm | | | |

When the conventional stepped optical device is employed under conditions identical to those of Table 1 as in Table 3 below, the output power is degraded to 39.92 mW.

TABLE 3

Priority on Efficiency (Conventional HOE)

| Pickup Design Calculation Condition | | | | Calculated value | |
|---|---|---|---|---|---|
| 1. Objective lens | NA 0.5 | f = 3.2 | Transmittance 95% | Objective lens effective diameter | 3.20 mm |
| | | | | Collimator lens NA | At least 0.18 |
| 2. Collimator lens | NA 0.15 | f = 9 mm | Transmittance 95% | Optical Magnification | 2.81 times |
| | | | | Lens bond angle | 20.48 deg |
| 3. Laser | Wavelength 780 nm | CW 70 mW | Pulse 0 mW | Lens bond efficiency | 82.24% |
| | θ// 7.5 deg | θ⊥ 17 deg | | effective θ//angle | 7.50 deg |
| | | | | effective θ⊥ angle | 17.00 deg |
| 4. Beam formation magnification | θ// 1 time | θ⊥ 1 time | Transmittance 100% | | |
| 5. Beam splitter | Tp 100% | | Transmittance 98% | Pick efficiency | 57.03% |
| | | | | CW output power | 39.92 mW |

TABLE 3-continued

Priority on Efficiency (Conventional HOE)

| Pickup Design Calculation Condition | | | | Calculated value | |
|---|---|---|---|---|---|
| 6. HOE | Spectral ratio 80% | | Transmittance 100% | Pulse output power | 0.00 mW |
| | | | | Rim intensity θ// | 0.57% |
| 7. Rising mirror | | | Transmittance 98% | Rim intensity θ⊥ | 36.57% |
| | θ//direction | θ⊥ direction | | | |
| Rim intensity | 0.6% | 36.6% | | | |
| Eclipse coefficient | 1.60 | 0.71 | | | |
| Expected spot diameter | 1.460 μm | 1.384 μm | | | |

When the conventional stepped optical device is employed under the conditions identical to those of Table 2 as in Table 4 below, the output power is degraded to 41.32 mW.

Figure 26:
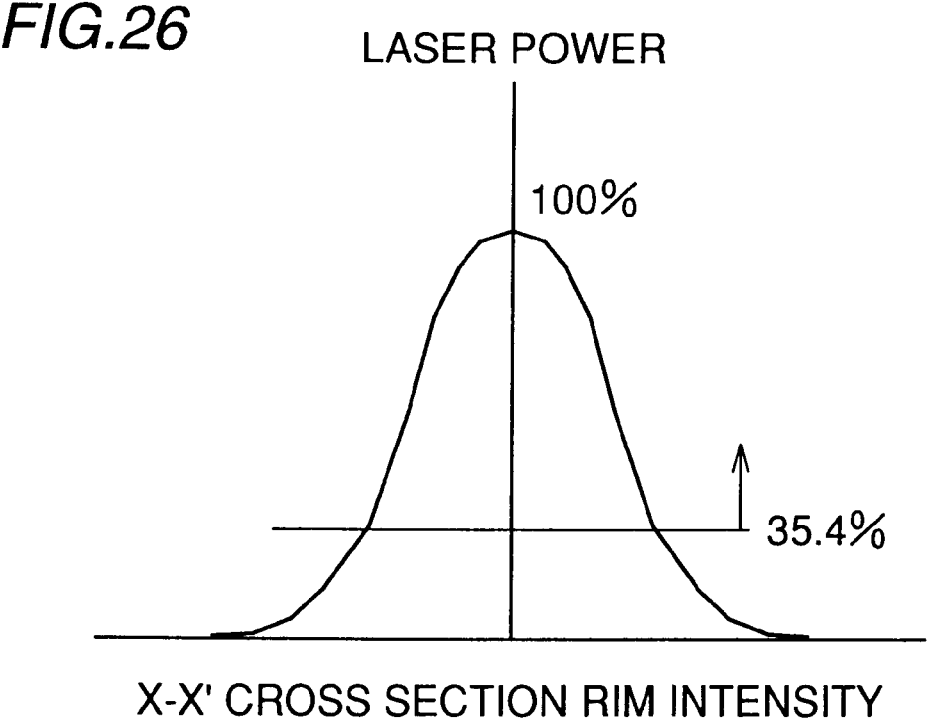
FIG. 26 shows the intensity distribution of the laser beam along cross section X–X' of FIG. 25.
Figure 27:
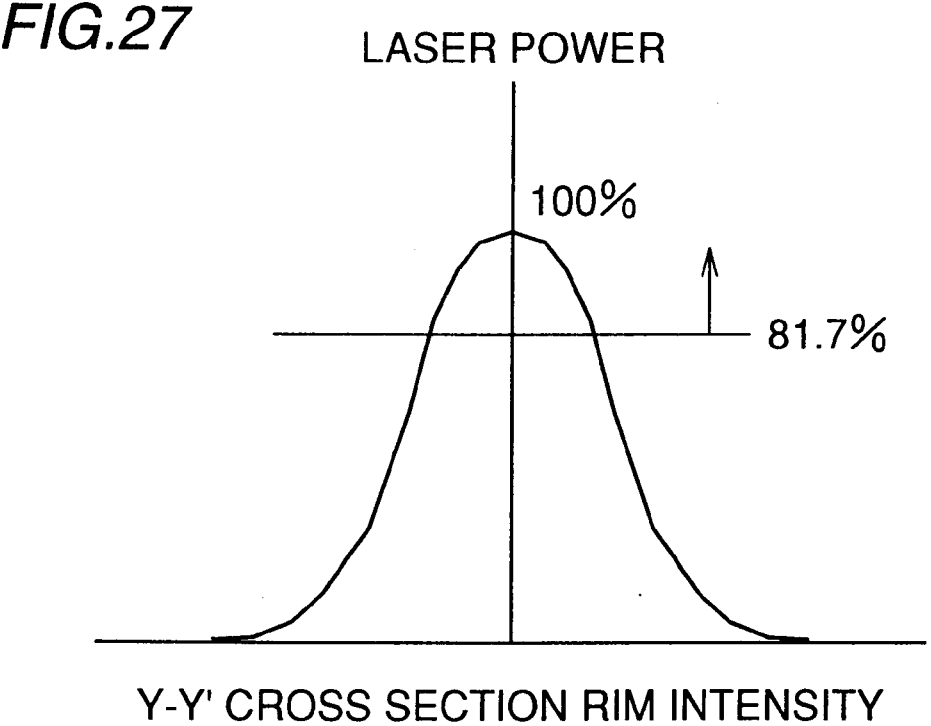
FIG. 27 shows the intensity distribution of the laser beam along cross section Y–Y' of FIG. 25.

FIG. 26 and to 81.7% in the longer diameter direction as shown in FIG. 27.

By setting the effective numerical aperture NA of the objective lens to 0.5, the output power of the laser light

TABLE 4

Priority on Efficiency (Conventional HOE)

| Pickup Design Calculation Condition | | | | Calculated value | |
|---|---|---|---|---|---|
| 1. Objective lens | NA 0.53 | f = 3.2 | Transmittance 95% | Objective lens effective diameter | 3.39 mm |
| | | | | Collimator lens NA | At least 0.19 |
| 2. Collimator lens | NA 0.15 | f = 9 mm | Transmittance 95% | Optical Magnification | 2.81 times |
| | | | | Lens bond angle | 21.72 deg |
| 3. Laser | Wavelength 780 nm | CW 70 mW | Pulse 0 mW | Lens bond efficiency | 85.13% |
| | θ// 7.5 deg | θ⊥ 17 deg | | effective θ//angle | 7.50 deg |
| | | | | effective θ⊥ angle | 17.00 deg |
| 4. Beam formation magnification | θ// 1 time | θ⊥ 1 time | Transmittance 100% | | |
| 5. Beam splitter | Tp 100% | | Transmittance 98% | Pick efficiency | 59.03% |
| | | | | CW output power | 41.32 mW |
| 6. HOE | Spectral ratio 80% | | Transmittance 100% | Pulse output power | 0.00 mW |
| | | | | Rim intensity θ// | 0.30% |
| 7. Rising mirror | | | Transmittance 98% | Rim intensity θ⊥ | 32.24% |
| | θ//direction | θ⊥ direction | | | |
| Rim intensity | 0.3% | 32.2% | | | |
| Eclipse coefficient | 1.70 | 0.76 | | | |
| Expected spot diameter | 1.378 μm | 1.314 μm | | | |

Figure 25:
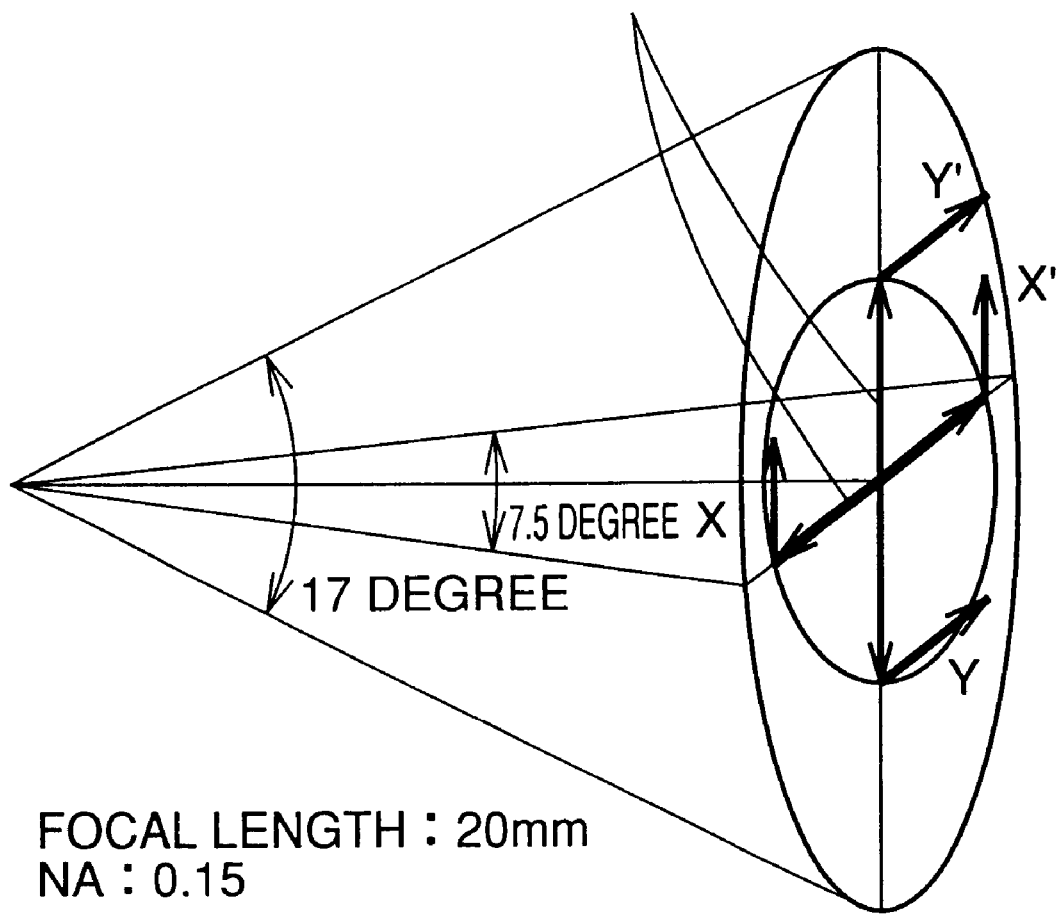
FIG. 25 is a diagram to describe the rim intensity when priority is given on the spot size.

The rim intensity when priority is given on the spot size will be described here. As shown in FIG. 25, a laser light source having a broadening angle of 7.5° in the shorter diameter direction and 17° in the longer diameter direction is employed. A collimator lens having an effective numerical aperture NA of 0.15 at the focal length f of 20 mm is employed. The case is considered where the rim intensity is set to 35.4% in the shorter diameter direction as shown in source to 70 mW and the other parameters to appropriate values as shown in Table 5 below, the output power of the objective lens becomes 20.41 mW when using the kinoform type optical device 6. Although the output power becomes lower than that corresponding to Table 1 where priority is given on the efficiency, the spot size becomes smaller than that of Table 1.

TABLE 5

Priority on spot size (New HOE)

| Pickup Design Calculation Condition | | | | Calculated value | |
|---|---|---|---|---|---|
| 1. Objective lens | NA 0.5 | f = 3.2 | Transmittance 95% | Objective lens effective diameter | 3.20 mm |
| | | | | Collimator lens NA | At least 0.08 |
| 2. Collimator lens | NA 0.15 | f = 20 mm | Transmittance 95% | Optical Magnification | 6.25 times |
| | | | | Lens bond angle | 9.18 deg |
| 3. Laser | Wavelength 780 nm | CW 70 mW | Pulse 0 mW | Lens bond efficiency | 33.64% |
| | θ// 7.5 deg | θ⊥ 17 deg | | effective θ//angle | 7.50 deg |
| | | | | effective θ⊥ angle | 17.00 deg |
| 4. Beam formation magnification | θ// 1 time | θ⊥ 1 time | Transmittance 100% | | |
| 5. Beam splitter | Tp 100% | | Transmittance 98% | Pick efficiency | 29.15% |
| | | | | CW output power | 20.41 mW |
| 6. HOE | Spectral ratio 100% | | Transmittance 100% | Pulse output power | 0.00 mW |
| | | | | Rim intensity θ// | 35.42% |
| 7. Rising mirror | | | Transmittance 98% | Rim intensity θ⊥ | 81.71% |
| | θ//direction | θ⊥ direction | | | |
| Rim intensity | 35.4% | 81.7% | | | |
| Eclipse coefficient | 0.72 | 0.32 | | | |
| Expected spot diameter | 1.386 μm | 1.313 μm | | | |

If the effective numerical aperture NA of the objective lens is increased to 0.53 of the objective lens as shown in Table 6, the output power increases to 22.05 mW. Although this output power becomes lower than that of Table 2 where priority is given on the efficiency, the spot size becomes smaller than that of Table 2.

TABLE 6

Priority on spot size (New HOE)

| Pickup Design Calculation Condition | | | | Calculated value | |
|---|---|---|---|---|---|
| 1. Objective lens | NA 0.53 | f = 3.2 | Transmittance 95% | Objective lens effective diameter | 3.39 mm |
| | | | | Collimator lens NA | At least 0.08 |
| 2. Collimator lens | NA 0.15 | f = 20 mm | Transmittance 95% | Optical Magnification | 6.25 times |
| | | | | Lens bond angle | 9.73 deg |
| 3. Laser | Wavelength 780 nm | CW 70 mW | Pulse 0 mW | Lens bond efficiency | 36.37% |
| | θ// 7.5 deg | θ⊥ 17 deg | | effective θ//angle | 7.50 deg |
| | | | | effective θ⊥ angle | 17.00 deg |
| 4. Beam formation magnification | θ// 1 time | θ⊥ 1 time | Transmittance 100% | | |

TABLE 6-continued

Priority on spot size (New HOE)

| Pickup Design Calculation Condition | | | | Calculated value | |
|---|---|---|---|---|---|
| 5. Beam splitter | Tp 100% | | Transmittance 98% | Pick efficiency | 31.52% |
| | | | | CW output power | 22.06 mW |
| 6. HOE | Spectral ratio 100% | | Transmittance 100% | Pulse output power | 0.00 mW |
| | | | | Rim intensity $\theta//$ | 31.15% |
| 7. Rising mirror | | | Transmittance 98% | Rim intensity $\theta \perp$ | 79.69% |
| | $\theta//$direction | $\theta \perp$ direction | | | |
| Rim intensity | 31.1% | 79.7% | | | |
| Eclipse coefficient | 0.76 | 0.34 | | | |
| Expected spot diameter | 1.316 μm | 1.241 μm | | | |

When a conventional stepped optical device is employed under conditions identical to those of the above Table 5 as in Table 7 below, the output power is reduced to 16.33 mW.

When a conventional stepped optical device is employed under conditions identical to those of the above Table 6 as in Table 8 below, the output power is reduced to 17.65 mW.

TABLE 7

Priority on spot size (Conventional HOE)

| Pickup Design Calculation Condition | | | | Calculated value | |
|---|---|---|---|---|---|
| 1. Objective lens | NA 0.5 | f = 3.2 | Transmittance 95% | Objective lens effective diameter | 3.20 mm |
| | | | | Collimator lens NA | At least 0.08 |
| 2. Collimator lens | NA 0.15 | f = 20 mm | Transmittance 95% | Optical Magnification | 6.25 times |
| | | | | Lens bond angle | 9.18 deg |
| 3. Laser | Wavelength 780 nm | CW 70 mW | Pulse 0 mW | Lens bond efficiency | 33.64% |
| | $\theta//$ 7.5 deg | $\theta \perp$ 17 deg | | effective $\theta//$angle | 7.50 deg |
| | | | | effective $\theta \perp$ angle | 17.00 deg |
| 4. Beam formation magnification | $\theta//$ 1 time | $\theta \perp$ 1 time | Transmittance 100% | | |
| 5. Beam splitter | Tp 100% | | Transmittance 98% | Pick efficiency | 23.32% |
| | | | | CW output power | 16.33 mW |
| 6. HOE | Spectral ratio 80% | | Transmittance 100% | Pulse output power | 0.00 mW |
| | | | | Rim intensity $\theta//$ | 35.42% |
| 7. Rising mirror | | | Transmittance 98% | Rim intensity $\theta \perp$ | 81.71% |
| | $\theta//$direction | $\theta \perp$ direction | | | |
| Rim intensity | 35.4% | 81.7% | | | |
| Eclipse coefficient | 0.72 | 0.32 | | | |
| Expected spot diameter | 1.386 μm | 1.313 μm | | | |

TABLE 8

Priority on spot size (Conventional HOE)

| Pickup Design Calculation Condition | | | | Calculated value | |
|---|---|---|---|---|---|
| 1. Objective lens | NA 0.53 | f = 3.2 | Transmittance 95% | Objective lens effective diameter | 3.39 mm |
| | | | | Collimator lens NA | At least 0.08 |
| 2. Collimator lens | NA 0.15 | f = 20 mm | Transmittance 95% | Optical Magnification | 6.25 times |
| | | | | Lens bond angle | 9.73 deg |
| 3. Laser | Wavelength 780 nm | CW 70 mW | Pulse 0 mW | Lens bond efficiency | 36.37% |
| | θ// 7.5 deg | θ⊥ 17 deg | | effective θ//angle | 7.50 deg |
| | | | | effective θ⊥ angle | 17.00 deg |
| 4. Beam formation magnification | θ// 1 time | θ⊥ 1 time | Transmittance 100% | | |
| 5. Beam splitter | Tp 100% | | Transmittance 98% | Pick efficiency | 25.22% |
| | | | | CW output power | 17.65 mW |
| 6. HOE | Spectral ratio 80% | | Transmittance 100% | Pulse output power | 0.00 mW |
| | | | | Rim intensity θ// | 31.15% |
| 7. Rising mirror | | | Transmittance 98% | Rim intensity θ⊥ | 79.69% |

| | θ//direction | θ⊥ direction |
|---|---|---|
| Rim intensity | 31.1% | 79.7% |
| Eclipse coefficient | 0.76 | 0.34 |
| Expected spot diameter | 1.316 μm | 1.241 μm |

Figure 28:
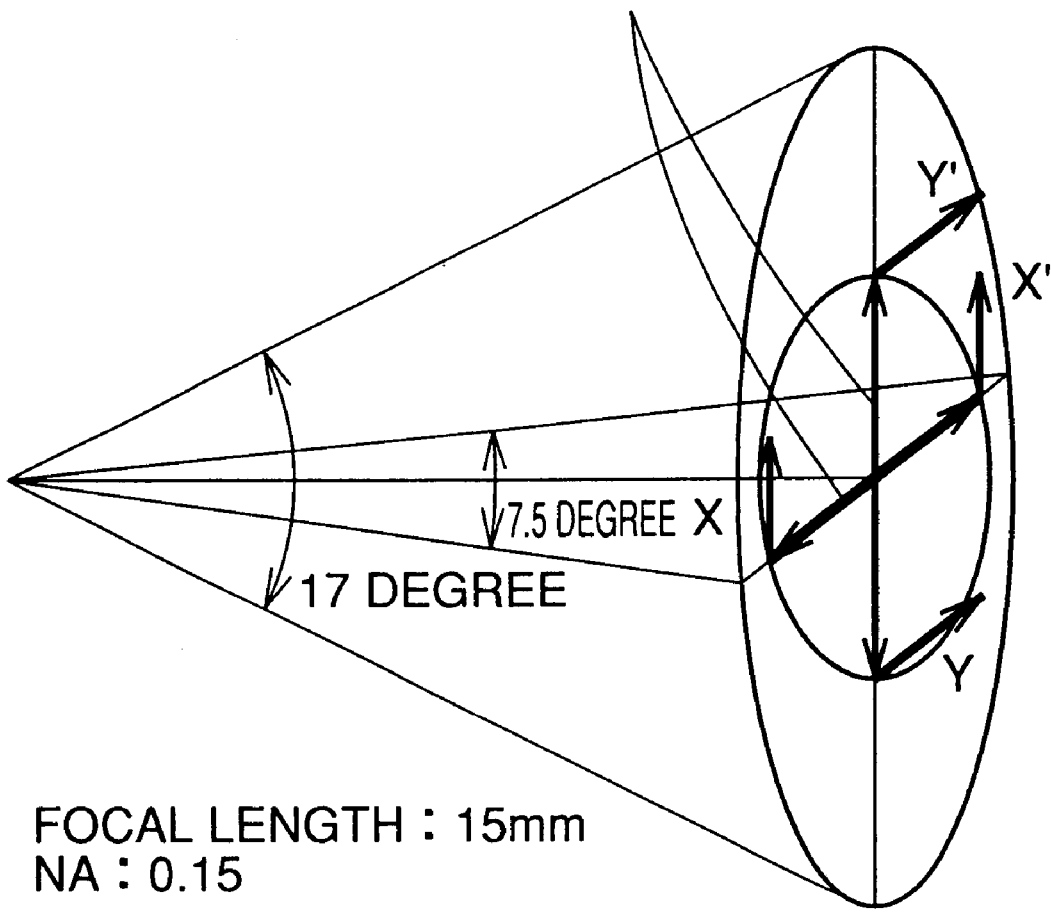
FIG. 28 is a diagram to describe the rim intensity suitable for an optical pickup device of eightfold speed.

Next, an example of the rim intensity suitable for an eightfold-speed optical pickup device will be described. As shown in FIG. 28, a laser light source having a broadening angle of 7.5° in the shorter diameter direction and 17° in the longer diameter direction is employed. A collimator lens having an effective numerical aperture NA of 0.15 with a focal length f of 15 mm is employed. The case is considered where the rim intensity is set to 15.8% in the shorter diameter direction as shown in FIG. 29 and to 69.8% in the longer diameter direction as shown in FIG. 30.

When the effective numerical aperture NA of the objective lens is set to 0.5, the output power of the laser beam set to 70 mW, and the other parameters set to appropriate values as shown in Table 9, the output power from the objective lens becomes 30.62 mW when using the kinoform type optical device 6. Since recording and reproduction at the eightfold speed is possible if the output power is at least 30 mW, operation thereof is possible in this case.

TABLE 9

Eightfold-speed pickup (New HOE)

| Pickup Design Calculation Condition | | | | Calculated value | |
|---|---|---|---|---|---|
| 1. Objective lens | NA 0.5 | F = 3.2 | Transmittance 95% | Objective lens effective diameter | 3.20 mm |
| | | | | Collimator lens NA | At least 0.11 |
| 2. Collimator lens | NA 0.15 | f = 15 mm | Transmittance 95% | Optical Magnification | 4.69 times |
| | | | | Lens bond angle | 12.25 deg |
| 3. Laser | Wavelength 780 nm | CW 70 mW | Pulse 0 mW | Lens bond efficiency | 50.47% |
| | θ// 7.5 deg | θ⊥ 17 deg | | effective θ//angle | 7.50 deg |
| | | | | effective θ⊥ angle | 17.00 deg |

TABLE 9-continued

Eightfold-speed pickup (New HOE)

| Pickup Design Calculation Condition | | | | Calculated value | |
|---|---|---|---|---|---|
| 4. Beam formation magnification | θ// 1 time | θ⊥ 1 time | Transmittance 100% | | |
| 5. Beam splitter | Tp 100% | | Transmittance 98% | Pick efficiency | 43.75% |
| | | | | CW output power | 30.62 mW |
| 6. HOE | Spectral ratio 100% | | Transmittance 100% | Pulse output power | 0.00 mW |
| | | | | Rim intensity θ// | 15.75% |
| 7. Rising mirror | | | Transmittance 98% | Rim intensity θ⊥ | 69.79% |
| | θ//direction | θ⊥ direction | | | |
| Rim intensity | 15.8% | 69.8% | | | |
| Eclipse coefficient | 0.96 | 0.43 | | | |
| Expected spot diameter | 1.428 μm | 1.326 μm | | | |

When the effective numerical aperture NA of the objective lens is increased to 0.53 as shown in Table 10, the output power from the objective lens becomes 33.32 mW. Recording and reproduction at the eightfold speed is possible in this case.

TABLE 10

Eightfold-speed pickup (New HOE)

| Pickup Design Calculation Condition | | | | Calculated value | |
|---|---|---|---|---|---|
| 1. Objective lens | NA 0.53 | F = 3.2 | Transmittance 95% | Objective lens effective diameter | 3.39 mm |
| | | | | Collimator lens NA | At least 0.11 |
| 2. Collimator lens | NA 0.15 | f = 15 mm | Transmittance 95% | Optical Magnification | 4.69 times |
| | | | | Lens bond angle | 12.98 deg |
| 3. Laser | Wavelength 780 nm | CW 70 mW | Pulse 0 mW | Lens bond efficiency | 54.92% |
| | θ// 7.5 deg | θ⊥ 17 deg | | effective θ//angle | 7.50 deg |
| | | | | effective θ⊥ angle | 17.00 deg |
| 4. Beam formation magnification | θ// 1 time | θ⊥ 1 time | Transmittance 100% | | |
| 5. Beam splitter | Tp 100% | | Transmittance 98% | Pick efficiency | 47.60% |
| | | | | CW output power | 33.32 mW |
| 6. HOE | Spectral ratio 100% | | Transmittance 100% | Pulse output power | 0.00 mW |
| | | | | Rim intensity θ// | 12.52% |
| 7. Rising mirror | | | Transmittance 98% | Rim intensity θ⊥ | 66.74% |
| | θ//direction | θ⊥ direction | | | |
| Rim intensity | 12.5% | 66.7% | | | |
| Eclipse coefficient | 1.02 | 0.45 | | | |
| Expected spot diameter | 1.354 μm | 1.255 μm | | | |

When a conventional stepped optical device is employed under conditions identical to those of Table 9 as in Table 11 below, the output power from the objective lens is reduced to 24.50 mW. In this case, recording and reproduction at eightfold speed is not possible.

When a conventional stepped optical device is employed under conditions identical to those of Table 10 as in Table 12 below, the output power from the objective lens is reduced to 26.66 mW. In this case, recording and reproduction at eightfold speed is not possible.

TABLE 11

Eightfold-speed pickup (Conventional HOE)

| Pickup Design Calculation Condition | | | | | Calculated value | |
|---|---|---|---|---|---|---|
| 1. Objective lens | NA 0.5 | f = 3.2 | Transmittance 95% | Objective lens effective diameter | 3.20 mm | |
| | | | | Collimator lens NA | At least 0.11 | |
| 2. Collimator lens | NA 0.15 | f = 15 mm | Transmittance 95% | Optical Magnification | 4.69 times | |
| | | | | Lens bond angle | 12.25 deg | |
| 3. Laser | Wavelength 780 nm | CW 70 mW | Pulse 0 mW | Lens bond efficiency | 50.47% | |
| | $\theta_{//}$ 7.5 deg | $\theta \perp$ 17 deg | | effective $\theta_{//}$ angle | 7.50 deg | |
| | | | | effective $\theta \perp$ angle | 17.00 deg | |
| 4. Beam formation magnification | $\theta_{//}$ 1 time | $\theta \perp$ 1 time | Transmittance 100% | | | |
| 5. Beam splitter | Tp 100% | | Transmittance 98% | Pick efficiency | 35.00% | |
| | | | | CW output power | 24.50 mW | |
| 6. HOE | Spectral ratio 80% | | Transmittance 100% | Pulse output power | 0.00 mW | |
| | | | | Rim intensity $\theta_{//}$ | 15.75% | |
| 7. Rising mirror | | | Transmittance 98% | Rim intensity $\theta \perp$ | 69.79% | |
| | $\theta_{//}$ direction | $\theta \perp$ direction | | | | |
| Rim intensity | 15.8% | 69.8% | | | | |
| Eclipse coefficient | 0.96 | 0.43 | | | | |
| Expected spot diameter | 1.428 μm | 1.326 μm | | | | |

TABLE 12

Eightfold-speed pickup (Conventional HOE)

| Pickup Design Calculation Condition | | | | | Calculated value | |
|---|---|---|---|---|---|---|
| 1. Objective lens | NA 0.53 | f = 3.2 | Transmittance 95% | Objective lens effective diameter | 3.39 mm | |
| | | | | Collimator lens NA | At least 0.11 | |
| 2. Collimator lens | NA 0.15 | f = 15 mm | Transmittance 95% | Optical Magnification | 4.69 times | |
| | | | | Lens bond angle | 12.98 deg | |
| 3. Laser | Wavelength 780 nm | CW 70 mW | Pulse 0 mW | Lens bond efficiency | 54.92% | |
| | $\theta_{//}$ 7.5 deg | $\theta \perp$ 17 deg | | effective $\theta_{//}$ angle | 7.50 deg | |
| | | | | effective $\theta \perp$ angle | 17.00 deg | |
| 4. Beam formation magnification | $\theta_{//}$ 1 time | $\theta \perp$ 1 time | Transmittance 100% | | | |
| 5. Beam splitter | Tp 100% | | Transmittance 98% | Pick efficiency | 38.08% | |
| | | | | CW output power | 26.66 mW | |

TABLE 12-continued

Eightfold-speed pickup (Conventional HOE)

| Pickup Design Calculation Condition | | | | Calculated value | |
|---|---|---|---|---|---|
| 6. HOE | Spectral ratio 80% | | Transmittance 100% | Pulse output power | 0.00 mW |
| | | | | Rim intensity θ// | 12.52% |
| 7. Rising mirror | | | Transmittance 98% | Rim intensity θ⊥ | 66.74% |
| | θ//direction | θ⊥ direction | | | |
| Rim intensity | 12.5% | 66.7% | | | |
| Eclipse coefficient | 1.02 | 0.45 | | | |
| Expected spot diameter | 1.354 μm | 1.255 μm | | | |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup apparatus recording and/or reproducing a signal onto/from a first optical disk and a second optical disk thicker than said first optical disk, comprising:
   a light source generating a laser beam;
   an objective lens located opposite to said first or second optical disks; and
   an optical device arranged between said light source and said objective lens to directly transmit the laser beam from said light source while maintaining a laser beam intensity during recording or reproduction of said first optical disk, and bending substantially the laser beam from said light source substantially entirely to increase the diameter of the laser beam to guide the center portion of said laser beam to said objective lens and guiding the peripheral portion of said laser beam outside said objective lens while maintaining substantially a laser beam intensity during recording or reproduction of said second optical disk.

2. The optical pickup device according to claim 1, wherein said optical device comprises
   a first optical member (60, 810) having a first refractive index, and
   a second optical member (61, 801, 21) in contact with said first optical member, and having a first refractive index upon recording or reproduction of said first optical disk, and a second refractive index differing from said first refractive index upon recording or reproduction of said second optical disk.

3. The optical pickup device according to claim 2, wherein said light source generates a first laser beam having a first wavelength during recording or reproduction of said first optical disk, and generates a second laser beam having a second wavelength differing from said first wavelength upon recording or reproduction of said second optical disk,
   said first optical member having said first refractive index at said first and second wavelengths, and
   said second optical member having said first refractive index at said first wavelength and said second refractive index at said second wavelength.

4. The optical pickup device according to claim 3, wherein said first optical member (60) includes a hologram (601) formed to be in contact with said second optical member.

5. The optical pickup device according to claim 4, wherein
   said first optical member is arranged at said light source side,
   said second optical member is arranged at said objective lens side,
   said first refractive index is higher than said second refractive index.

6. The optical pickup device according to claim 4, wherein said hologram includes a plurality of annular projections (602) formed concentrically.

7. The optical pickup device according to claim 6, wherein said annular projections have a pitch smaller as towards the circumference.

8. The optical pickup device according to claim 6, wherein each of said annular projections has a triangular cross section radially.

9. The optical pickup device according to claim 3, wherein
   said first optical member (810) is arranged at said objective lens side, and has a concave curve plane (802) in contact with said second optical member (801),
   said second optical member (801) is arranged at said light source side, and has a convex curve plane (802) in contact with said first optical member (810),
   said first refractive index is higher than said second refractive index.

10. The optical pickup device according to claim 3, wherein said light source includes
    a first semiconductor laser (1A) generating said first laser beam,
    a second semiconductor laser (1B) generating said second laser beam,
    said optical pickup device further comprising an optical axis correction device (501) setting an optical axis of said first laser beam and an optical axis of said second laser beam in coincidence.

11. The optical pickup device according to claim 2, wherein said second optical member (21) includes
    first and second transparent electrodes (203, 205) opposite to each other, and
    liquid crystal (204) sandwiched between said first and second transparent electrodes.

12. The optical pickup device according to claim 11, wherein said first optical member (60) includes a hologram (601) formed to be in contact with said second optical member.

13. The optical pickup device according to claim 12, wherein said first optical member is arranged at said light source side, said second optical member is arranged at said objective lens side, said first refractive index is higher than said second refractive index.

14. The optical pickup device according to claim 12, wherein said hologram includes a plurality of annular projections (602) formed concentrically.

15. The optical pickup device according to claim 14, wherein said annular projections have a pitch smaller as towards the circumference.

16. The optical pickup device according to claim 14, wherein each of said annular projections has a triangular cross section radially.

17. The optical pickup device according to claim 1, further comprising a collimator lens (2) having a focus where said optical source (1, 100) is positioned, wherein a shorter diameter of a laser beam collimated by said collimator lens (2) is longer than an effective diameter of said objective lens (7).

\* \* \* \* \*